United States Patent
Ko et al.

(10) Patent No.: US 10,624,136 B2
(45) Date of Patent: Apr. 14, 2020

(54) METHOD FOR TRANSMITTING AND RECEIVING PHYSICAL RANDOM ACCESS CHANNEL AND APPARATUS THEREFOR

(71) Applicant: LG ELECTRONICS INC., Seoul (KR)

(72) Inventors: Hyunsoo Ko, Seoul (KR); Sukhyon Yoon, Seoul (KR); Eunsun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/246,204

(22) Filed: Jan. 11, 2019

(65) Prior Publication Data

US 2019/0223228 A1    Jul. 18, 2019

Related U.S. Application Data

(60) Provisional application No. 62/670,046, filed on May 11, 2018, provisional application No. 62/630,845, (Continued)

(51) Int. Cl.
    *H04W 74/08*    (2009.01)
    *H04W 74/00*    (2009.01)
    (Continued)

(52) U.S. Cl.
    CPC ....... *H04W 74/0891* (2013.01); *H04L 5/0048* (2013.01); *H04L 5/0053* (2013.01);
    (Continued)

(58) Field of Classification Search
    CPC ........... H04W 74/0891; H04W 74/085; H04W 72/0446; H04W 72/042; H04W 74/006; H04W 74/008; H04L 5/0048
    See application file for complete search history.

(56) References Cited

U.S. PATENT DOCUMENTS

2009/0203323 A1    8/2009    Ratasuk et al.
2010/0113053 A1    5/2010    Bienas et al.
(Continued)

FOREIGN PATENT DOCUMENTS

JP    2017092508    5/2017
KR    1020110003362    1/2011
(Continued)

OTHER PUBLICATIONS

3GPP TSG-RAN WG1 Meeting #91, R1-1721639, Dec. 4, 2017. See p. 5, 7, 16, 30 (Year: 2017).*
(Continued)

*Primary Examiner* — Walli Z Butt
(74) *Attorney, Agent, or Firm* — Fish & Richardson P.C.

(57) ABSTRACT

Disclosed herein is a method for transmitting a physical random access channel (PRACH) by a user equipment in a wireless communication system. In particular, the method includes receiving information about PRACH resource allocation, and transmitting, based on the information, the PRACH on any one of one or more PRACH occasions allocated in a PRACH slot, wherein a number of the one or more PRACH occasions is based on a preamble format and a starting Orthogonal Frequency Division Multiplexing (OFDM) symbol for the PRACH.

9 Claims, 22 Drawing Sheets

Related U.S. Application Data filed on Feb. 15, 2018, provisional application No. 62/617,123, filed on Jan. 12, 2018.

(51) Int. Cl.
*H04L 5/00* (2006.01)
*H04W 72/04* (2009.01)

(52) U.S. Cl.
CPC ..... *H04W 72/042* (2013.01); *H04W 72/0446* (2013.01); *H04W 74/006* (2013.01); *H04W 74/008* (2013.01); *H04W 74/085* (2013.01); *H04W 74/0833* (2013.01); *H04L 5/0094* (2013.01)

(56) References Cited

U.S. PATENT DOCUMENTS

| | | | |
|---|---|---|---|
| 2010/0290408 A1 | 11/2010 | Steudle et al. | |
| 2011/0013542 A1 | 1/2011 | Yu et al. | |
| 2015/0181624 A1* | 6/2015 | Hwang | H04L 5/0053 370/329 |
| 2016/0286578 A1 | 9/2016 | Bertrand et al. | |
| 2017/0006637 A1 | 1/2017 | Sahlin et al. | |
| 2018/0167979 A1* | 6/2018 | Guo | H04W 74/0833 |
| 2018/0220450 A1* | 8/2018 | Aiba | H04W 74/004 |
| 2018/0220466 A1 | 8/2018 | Park et al. | |
| 2019/0104554 A1* | 4/2019 | Amuru | H04W 72/042 |
| 2019/0132882 A1* | 5/2019 | Li | H04W 74/0833 |

FOREIGN PATENT DOCUMENTS

| | | | |
|---|---|---|---|
| KR | 1020150111912 | 10/2015 | |
| KR | 1020170084754 | 7/2017 | |
| WO | WO-2018175705 A1 * | 9/2018 | H04B 7/0695 |

OTHER PUBLICATIONS

3GPP TSG-RAN WG1 Meeting #91, R1-1721044, Nov. 29, 2017. See p. 4 (Year: 2017).*
3GPP TSG-RAN WG1 Meeting #91, R1-1721585, Dec. 1, 2017. See p. 2, sec.3 (Year: 2017).*
Samsung, "Remaining details on PRACH formats," R1-17120277, 3GPP TSG RAN WG1 91, Reno, USA, Nov. 27-Dec. 1, 2017, 5 pages.
United States Office Action in U.S. Appl. No. 16/246,147, dated Jul. 8, 2019, 15 pages.
ZTE, Sanechips, "PRACH Resource Configuration," R1-1719345, 3GPP TSG RAN WG1 Meeting #91, Reno, USA, Nov. 27-Dec. 1, 2017, 22 pages.
LG Electronics, "Discussion on PRACH preamble format details," R1-1719897, 3GPP TSG RAN WG1 Meeting #91, Reno, USA, Nov. 27-Dec. 1, 2017, 10 pages.
Nokia, Nokia Shanghai Bell, "Remaining details on PRACH formats," R1-1720005, 3GPP TSG-RAN WG1#91, Reno, Nevada, USA, Nov. 27-Dec. 1, 2017, 8 pages.
CMCC, "Discussion on RACH configuration," R1-1720584, 3GPP TSG RAN WG1 Meeting 91, Reno, USA, Nov. 27-Dec. 1, 2017, 5 pages.
Convida Wireless, "Summary of Remaining details on PRACH formats," R1-1721639, 3GPP TSG RAN WG1 Meeting #91, Reno, USA, Nov. 27-Dec. 1, 2017, 60 pages.
United States Final Office Action in U.S. Appl. 16/246,147, dated Jan. 24, 2020, 10 pages.

* cited by examiner

FIG. 1
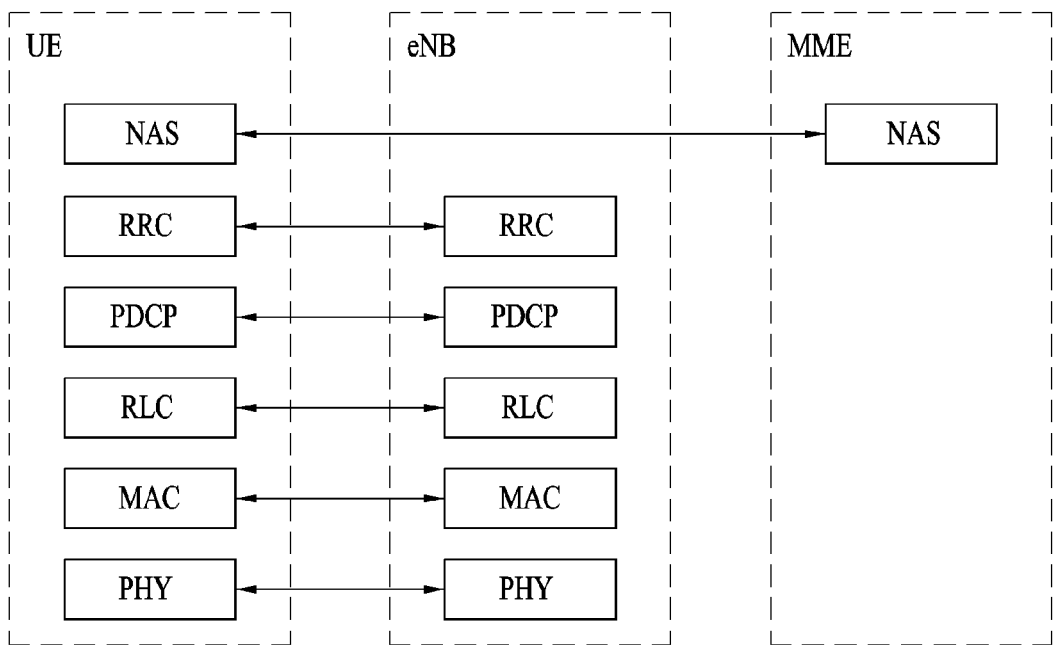
(A) CONTROL-PLANE PROTOCOL STACK
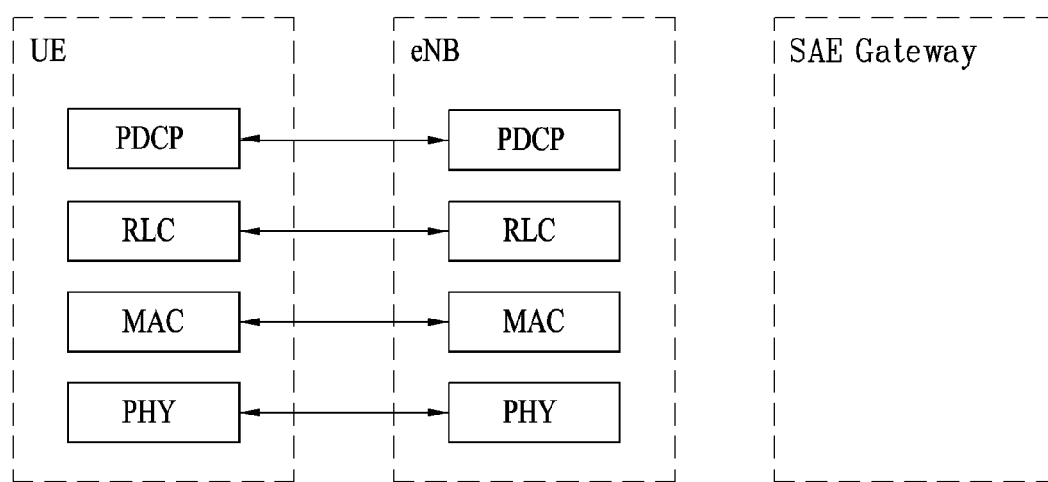
(B) USER-PLANE PROTOCOL STACK

FIG. 16

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| A1 | A1 | A1 | A1 | A1 | A1 | A1 | A1 | A1 | A1 | A1 | A1 | Null | |
| A1 | A1 | A1 | A1 | A1 | A1 | A1 | A1 | A1 | A1 | A1 | A1/B1 | | |
| B1 | B1 | B1 | B1 | B1 | B1 | B1 | B1 | B1 | B1 | B1 | B1 | | |
| A2 | A2 | A2 | A2 | A2 | A2 | A2 | A2 | A2 | A2 | A2 | A2 | Null | |
| A2 | A2 | A2 | A2 | A2 | A2 | A2 | A2 | A2 | A2 | A2/B2 | A2/B2 | | |
| A3 | A3 | A3 | A3 | A3 | A3 | A3 | A3 | A3 | A3 | A3 | A3 | Null | |
| A3 | A3 | A3 | A3 | A3 | A3 | A3 | A3/B3 | A3/B3 | A3/B3 | A3/B3 | A3/B3 | | |
| B4 | B4 | B4 | B4 | B4 | B4 | B4 | B4 | B4 | B4 | B4 | B4 | | |
| C0 | C0 | C0 | C0 | C0 | C0 | C0 | C0 | C0 | C0 | C0 | C0 | | |
| C2 | C2 | C2 | C2 | C2 | C2 | C2 | C2 | C2 | C2 | C2 | C2 | | |

(a)

| 0 | 1 | 2 | 3 | 4 | 5 | 6 | 7 | 8 | 9 | 10 | 11 | 12 | 13 |
|---|---|---|---|---|---|---|---|---|---|---|---|---|---|
| | Null | A1 | A1 | A1 | A1 | A1 | A1 | A1 | A1 | A1 | A1 | A1 | A1 |
| | Null | A1 | A1 | A1 | A1 | A1 | A1 | A1 | A1 | A1 | A1 | A1 | A1/B1 |
| | Null | B1 | B1 | B1 | B1 | B1 | B1 | B1 | B1 | B1 | B1 | B1 | B1 |
| | Null | A2 | A2 | A2 | A2 | A2 | A2 | A2 | A2 | A2 | A2 | A2 | A2 |
| | Null | A2 | A2 | A2 | A2 | A2 | A2 | A2 | A2 | A2 | A2/B2 | A2/B2 | A2/B2 |
| | Null | A3 | A3 | A3 | A3 | A3 | A3 | A3 | A3 | A3 | A3 | A3 | A3 |
| | Null | A3 | A3 | A3 | A3 | A3 | A3 | A3/B3 | A3/B3 | A3/B3 | A3/B3 | A3/B3 | A3/B3 |
| | Null | B4 | B4 | B4 | B4 | B4 | B4 | B4 | B4 | B4 | B4 | B4 | B4 |
| | Null | C0 | C0 | C0 | C0 | C0 | C0 | C0 | C0 | C0 | C0 | C0 | C0 |
| | Null | C2 | C2 | C2 | C2 | C2 | C2 | C2 | C2 | C2 | C2 | C2 | C2 |

(b)

| 7 | 8 | 9 | 10 | 11 | 12 | 13 |
|---|---|---|---|---|---|---|
| A1 | A1 | A1 | A1 | A1 | Null | |
| A1 | A1 | A1 | A1 | A1/B1 | | |
| B1 | B1 | B1 | B1 | B1 | | |
| A2 | A2 | A2 | A2 | A2 | Null | |
| A2 | A2/B2 | A2/B2 | A2/B2 | A2/B2 | | |
| A3 | A3 | A3 | A3 | A3 | Null | |
| A3/B3 | A3/B3 | A3/B3 | A3/B3 | A3/B3 | | |
| B4 | B4 | B4 | B4 | B4 | | |
| C0 | C0 | C0 | C0 | C0 | | |
| C2 | C2 | C2 | C2 | C2 | | |

(c)

FIG. 17
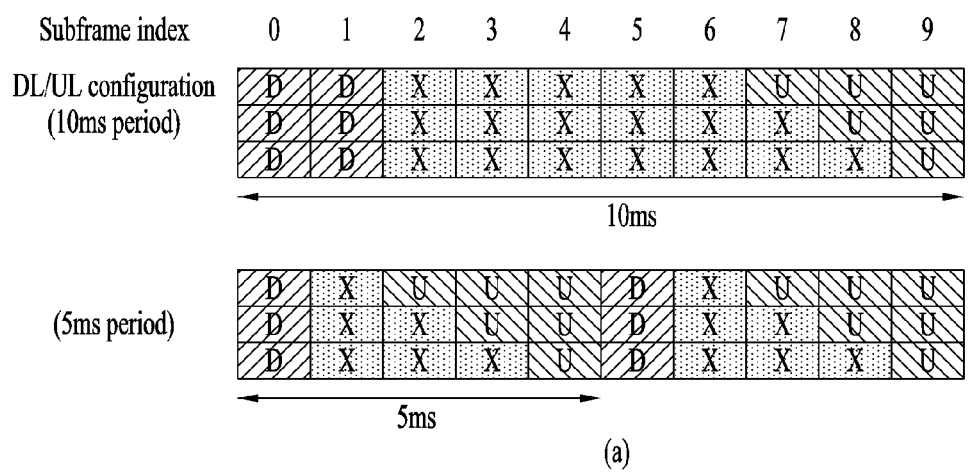
(a)
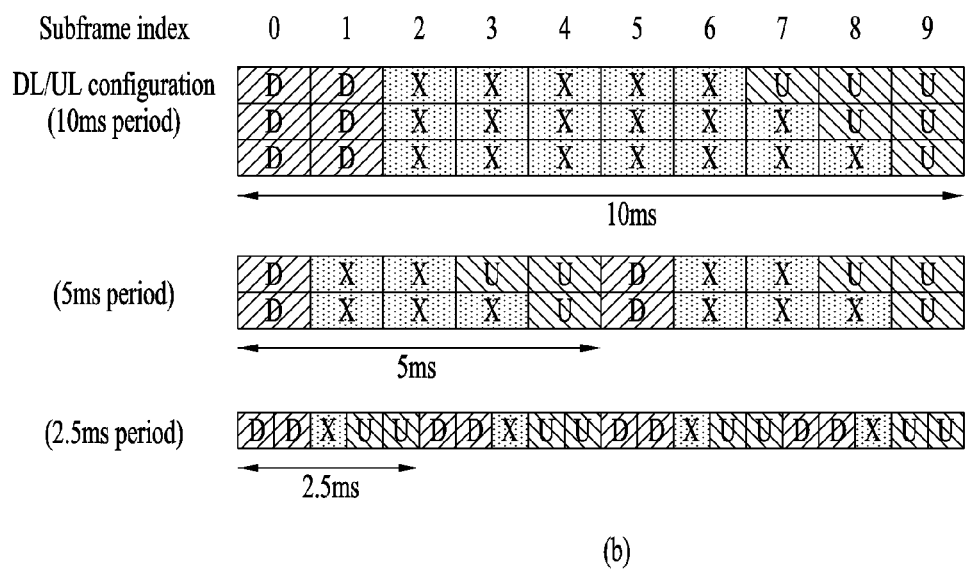
(b)

FIG. 20

| OS index | 0 | | 1 | | 2 | | 3 | | 4 | | 5 | | 6 | | 7 | | 8 | | 9 | | 10 | | 11 | | 12 | | 13 | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| 15kHz SCS | | | | | | | | | | | | | | | | | | | | | | | | | | | | |
| 30kHz SCS (1) | | | | | | | | | | | | | | | | | | | | | | | | | | | | |
| 30kHz SCS (2) | | | | | | | | | | | | | | | | | | | | | | | | | | | | |

(a)

| OS index | 0 | | 1 | | 2 | | 3 | | 4 | | 5 | | 6 | | 7 | | 8 | | 9 | | 10 | | 11 | | 12 | | 13 | |
|---|---|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 0 | 1 | 2 | 3 | 4 | 5 | 6 | 7 | 8 | 9 | 10 | 11 | 12 | 13 |
| 120kHz SCS | | | | | | | | | | | | | | | | | | | | | | | | | | | | |
| 240kHz SCS | | | | | | | | | | | | | | | | | | | | | | | | | | | | |

(b)

METHOD FOR TRANSMITTING AND RECEIVING PHYSICAL RANDOM ACCESS CHANNEL AND APPARATUS THEREFOR

PRIORITY

This application claims priority to U.S. Provisional Application Ser. No. 62/670,046 filed May 11, 2018, 62/630,845 filed Feb. 15, 2018, and 62/617,123, filed on Jan. 12, 2018, the entire contents of which are hereby incorporated by reference.

TECHNICAL FIELD

The present invention relates to a method for transmitting and receiving a physical random access channel (PRACH) and an apparatus therefor, and more particularly, to a method for acquiring information about a PRACH occasion and a PRACH slot through a PRACH configuration and transmitting/receiving a PRACH based on the information and an apparatus therefor.

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra high reliability, ultra low latency, and ultra high availability (e.g., vehicle to everything (V2X), emergency service, and remote control), and mMTC is a future-generation mobile communication scenario characterized by low cost, low energy, short packet, and massive connectivity (e.g., Internet of things (IoT)).

DISCLOSURE

Technical Problem

An object of the present invention devised to solve the problem lies in a method for transmitting and receiving a physical random access channel and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In one aspect of the present invention, provided herein is a method for transmitting a physical random access channel (PRACH) by a user equipment (UE) in a wireless communication system, the method including receiving information about PRACH resource allocation, and transmitting, based on the information, the PRACH on any one of one or more PRACH occasions allocated in a PRACH slot, wherein the number of the one or more PRACH occasions is based on a preamble format and a starting Orthogonal Frequency Division Multiplexing (OFDM) symbol for the PRACH.

Here, the preamble format and the starting OFDM symbol may be obtained via the information.

In addition, the one or more PRACH occasions may be consecutively allocated in the PRACH slot from the starting OFDM symbol.

A maximum number of the one or more PRACH occasions may be 6.

In addition, when the preamble format has a duration of two OFDM symbols, the number of the one or more PRACH occasions may be 6.

The one or more PRACH occasions may be allocated only to a second half of the PRACH slot.

In addition, when the preamble format has a duration of four OFDM symbols, the starting OFDM symbol may be 9.

In another aspect of the present invention, provided herein is a communication apparatus for transmitting a physical random access channel (PRACH) in a wireless communication system, the communication apparatus including a memory, and a processor connected to the memory, wherein the processor is configured to control receiving information about PRACH resource allocation, and transmitting, based on the information, the PRACH on any one of one or more PRACH occasions allocated in a PRACH slot, wherein the number of the one or more PRACH occasions is based on a preamble format and a starting Orthogonal Frequency Division Multiplexing (OFDM) symbol for the PRACH.

Here, the preamble format and the starting OFDM symbol may be obtained via the information.

The one or more PRACH occasions may be consecutively allocated in the PRACH slot, from the starting OFDM symbol.

A maximum number of the one or more PRACH occasions may be 6.

In addition, when the preamble format has a duration of two OFDM symbols, the number of the one or more PRACH occasions may be 6.

The one or more PRACH occasions may be allocated only to a second half of the PRACH slot.

In addition, when the preamble format has a duration of four OFDM symbols, the starting OFDM symbol may be 9.

In another aspect of the present invention, provided herein is a method for receiving a physical random access channel (PRACH) by a base station in a wireless communication system, the method including transmitting information related to PRACH resource allocation, and receiving, based on the information, the PRACH on any one of one or more PRACH occasions allocated in a PRACH slot, wherein the number of the one or more PRACH occasions is based on a preamble format and a starting Orthogonal Frequency Division Multiplexing (OFDM) symbol for the PRACH.

Advantageous Effects

According to the present invention, a PRACH may be efficiently transmitted to a BS while securing a region for transmitting and receiving downlink signals.

It will be appreciated by persons skilled in the art that the effects that can be achieved with the present disclosure are not limited to what has been particularly described hereinabove and other effects of the present disclosure will be more clearly understood from the following detailed description taken in conjunction with the accompanying drawings.

BRIEF DESCRIPTION OF THE DRAWINGS

FIG. 1 is a view illustrating the control-plane and user-plane architecture of radio interface protocols between a user equipment (UE) and an evolved UMTS terrestrial radio access network (E-UTRAN) in conformance to a 3rd generation partnership project (3GPP) radio access network standard.

FIGS. 15 to 16 are diagrams illustrating a method for determining a starting OFDM symbol for PRACH transmission.

FIGS. 17 to 18 are diagrams illustrating a method for determining a PRACH slot that may have a PRACH occasion.

FIGS. 20 to 21 are diagrams illustrating an embodiment of a method for allocating a PRACH occasion.

BEST MODE FOR CARRYING OUT THE INVENTION

Figure 2:
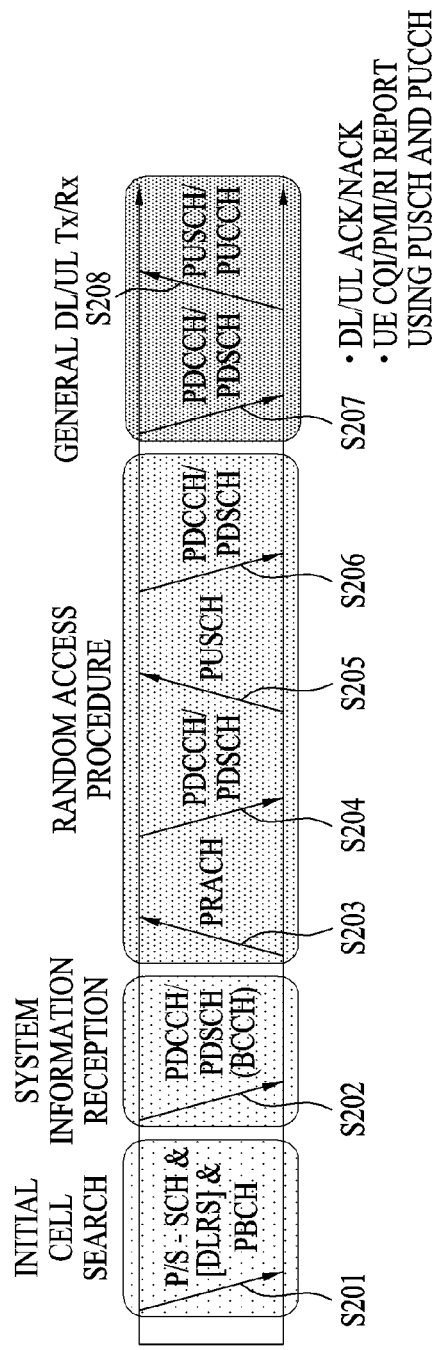
FIG. 2 is a view illustrating physical channels and a general signal transmission method using the physical channels in a 3GPP system.

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, Base Station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a UE. For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

FIG. 1 illustrates control-plane and user-plane protocol stacks in a radio interface protocol architecture conforming to a 3GPP wireless access network standard between a user equipment (UE) and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a DownLink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

Figure 3:
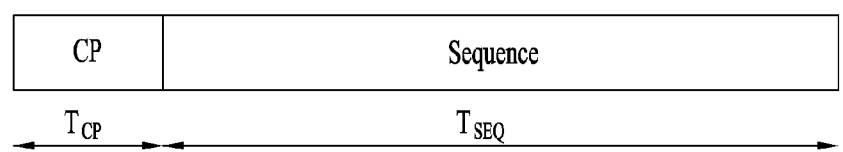
FIG. 3 illustrates a random access preamble format in LTE/LTE-A.

FIG. 3 illustrates a random access preamble format in a legacy LTE/LTE-A system.

In the legacy LTE/LTE-A system, a random access preamble, i.e., a RACH preamble, includes a cyclic prefix having a length TCP and a sequence part having a length TSEQ in a physical layer. The parameter values TCP and TSEQ are listed in the following table, and depend on the frame structure and the random access configuration. Higher layers control the preamble format. In the 3GPP LTE/LTE-A system, PRACH configuration information is signaled through system information and mobility control information of a cell. The PRACH configuration information indicates a root sequence index, a cyclic shift unit NCS of a Zadoff-Chu sequence, the length of the root sequence, and a preamble format, which are to be used for a RACH procedure in the cell. In the 3GPP LTE/LTE-A system, a PRACH opportunity, which is a timing at which the preamble format and the RACH preamble may be transmitted, is indicated by a PRACH configuration index, which is a part of the RACH configuration information (refer to Section 5.7 of 3GPP TS 36.211 and "PRACH-Config" of 3GPP TS 36.331). The length of the Zadoff-Chu sequence used for the RACH preamble is determined according to the preamble format (refer to Table 4)

TABLE 1

| Preamble format | TCP | TSEQ |
|---|---|---|
| 0 | 3168 × Ts | 24576 × Ts |
| 1 | 21024 × Ts | 24576 × Ts |
| 2 | 6240 × Ts | 2 × 24576 × Ts |
| 3 | 21024 × Ts | 2 × 24576 × Ts |
| 4 | 448 × Ts | 4096 × Ts |

In the LTE/LTE-A system, the RACH preamble is transmitted in a UL subframe. The transmission of a random access preamble is restricted to certain time and frequency resources. These resources are called PRACH resources, and enumerated in increasing order of the subframe number within the radio frame and the PRBs in the frequency domain such that index 0 correspond to the lowest numbered PRB and subframe within the radio frame. Random access resources are defined according to the PRACH configuration index (refer to the standard document of 3GPP TS 36.211). The PRACH configuration index is given by a higher layer signal (transmitted by an eNB).

The sequence part of the RACH preamble (hereinafter, preamble sequence) uses a Zadoff-Chu sequence. The preamble sequences for RACH are generated from Zadoff-Chu sequences with zero correlation zone, generated from one or several root Zadoff-Chu sequences. The network configures the set of preamble sequences the UE is allowed to use. In the legacy LTE/LTE-A system, there are 64 preambles available in each cell. The set of 64 preamble sequences in a cell is found by including first, in the order of increasing cyclic shift, all the available cyclic shifts of a root Zadoff-Chu sequence with the logical index RACH_ROOT_SEQUENCE, where RACH_ROOT_SEQUENCE is broadcasted as part of the system information. Additional preamble sequences, in case 64 preambles cannot be generated from a single root Zadoff-Chu sequence, are obtained from the root sequences with the consecutive logical indexes until all the 64 sequences are found. The logical root sequence order is cyclic: the logical index 0 is consecutive to 837. The relation between a logical root sequence index and physical root sequence index u is given by Table 2 and Table 3 for preamble formats 0~3 and 4, respectively.

TABLE 2

| Logical root sequence number | Physical root sequence number u (in increasing order of 상기 corresponding logical sequnce number) |
|---|---|
| 0~23 | 129, 710, 140, 699, 120, 719, 210, 629, 168, 671, 84, 755, 105, 734, 93, 746, 70, 769, 60, 779, 2, 837, 1, 838 |
| 24~29 | 56, 783, 112, 727, 148, 691 |
| 30~35 | 80, 759, 42, 797, 40, 799 |
| 36~41 | 35, 804, 73, 766, 146, 693 |
| 42~51 | 31, 808, 28, 811, 30, 809, 27, 812, 29, 810 |
| 52~63 | 24, 815, 48, 791, 68, 771, 74, 765, 178, 661, 136, 703 |
| 64~75 | 86, 753, 78, 761, 43, 796, 39, 800, 20, 819, 21, 818 |
| 76~89 | 95, 744, 202, 637, 190, 649, 181, 658, 137, 702, 125, 714, 151, 688 |
| 90~115 | 217, 622, 128, 711, 142, 697, 122, 717, 203, 636, 118, 721, 110, 729, 89, 750, 103, 736, 61, 778, 55, 784, 15, 824, 14, 825 |
| 116~135 | 12, 827, 23, 816, 34, 805, 37, 802, 46, 793, 207, 632, 179, 660, 145, 694, 130, 709, 223, 616 |
| 136~167 | 228, 611, 227, 612, 132, 707, 133, 706, 143, 696, 135, 704, 161, 678, |

TABLE 2-continued

| Logical root sequence number | Physical root sequence number u (in increasing order of 상기 corresponding logical sequnce number) |
|---|---|
| | 201, 638, 173, 666, 106, 733, 83, 756, 91, 748, 66, 773, 53, 786, 10, 829, 9, 830 |
| 168~203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204~263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264~327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328~383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384~455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456~513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514~561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562~629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630~659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660~707 | 257, 582, 273, 566, 255, 584, 254, 585, 245, 594, 251, 588, 412, 427, 372, 467, 282, 557, 403, 436, 396, 443, |

TABLE 2-continued

| Logical root sequence number | Physical root sequence number u (in increasing order of 상기 corresponding logical sequnce number) |
|---|---|
| | 392, 447, 391, 448, 382, 457, 389, 450, 294, 545, 297, 542, 311, 528, 344, 495, 345, 494, 318, 521, 331, 508, 325, 514, 321, 518 |
| 708~729 | 346, 493, 339, 500, 351, 488, 306, 533, 289, 550, 400, 439, 378, 461, 374, 465, 415, 424, 270, 569, 241, 598 |
| 730~751 | 231, 608, 260, 579, 268, 571, 276, 563, 409, 430, 398, 441, 290, 549, 304, 535, 308, 531, 358, 481, 316, 523 |
| 752~765 | 293, 546, 288, 551, 284, 555, 368, 471, 253, 586, 256, 583, 263, 576 |
| 766~777 | 242, 597, 274, 565, 402, 437, 383, 456, 357, 482, 329, 510 |
| 778~789 | 317, 522, 307, 532, 286, 553, 287, 552, 266, 573, 261, 578 |
| 790~795 | 236, 603, 303, 536, 356, 483 |
| 796~803 | 355, 484, 405, 434, 404, 435, 406, 433 |
| 804~809 | 235, 604, 267, 572, 302, 537 |
| 810~815 | 309, 530, 265, 574, 233, 606 |
| 816~819 | 367, 472, 296, 543 |
| 820~837 | 336, 503, 305, 534, 373, 466, 280, 559, 279, 560, 419, 420, 240, 599, 258, 581, 229, 610 |

NCS is given by Table 5 for preamble formats 0~3 and by Table 6 for preamble format 4.

TABLE 5

| | NCS value | |
|---|---|---|
| zeroCorrelationZoneConfig | Unrestricted set | Restricted set |
| 0 | 0 | 15 |
| 1 | 13 | 18 |
| 2 | 15 | 22 |
| 3 | 18 | 26 |
| 4 | 22 | 32 |
| 5 | 26 | 38 |
| 6 | 32 | 46 |
| 7 | 38 | 55 |
| 8 | 46 | 68 |
| 9 | 59 | 82 |
| 10 | 76 | 100 |
| 11 | 93 | 128 |
| 12 | 119 | 158 |
| 13 | 167 | 202 |
| 14 | 279 | 237 |
| 15 | 419 | — |

TABLE 3

| Logical root sequence number | Physical root sequence number u (in increasing order of the corresponding logical sequence number) |
|---|---|
| 0-19 | 1 138 2 137 3 136 4 135 5 134 6 133 7 132 8 131 9 130 10 129 |
| 20-89 | 11 128 12 127 13 126 14 125 15 124 16 123 17 122 18 121 19 120 20 119 |
| 40-59 | 21 118 22 117 23 116 24 115 25 114 26 113 27 112 28 111 29 110 30 109 |
| 60-79 | 31 108 32 107 33 106 34 105 35 104 36 103 37 102 38 101 39 100 40 99 |
| 80-99 | 41 98 42 97 43 96 44 95 45 94 46 93 47 92 48 91 49 90 50 89 |
| 100-119 | 51 88 52 87 53 86 54 85 55 84 56 83 57 82 58 81 59 80 60 79 |
| 120-137 | 61 78 62 77 63 76 64 75 65 74 66 73 67 72 68 71 69 70 — — |
| 138-837 | N/A | u-th root Zadoff-Chu sequence is defined by the following equation.

$$x_u(n) = e^{-j\frac{\pi u n(n+1)}{N_{ZC}}}, \quad 0 \le n \le N_{ZC} - 1 \qquad \text{Equation 1}$$

TABLE 4

| Preamble format | ZC |
|---|---|
| 0~3 | 39 |
| 4 | 39 |

From the u-th root Zadoff-Chu sequence, random access preambles with zero correlation zones of length NZC-1 are defined by cyclic shifts according to xu,v(n)=xu((n+Cv) mod NZC), where the cyclic shift is given by the following equation.

TABLE 6

| zeroCorrelationZoneConfig | NCS value |
|---|---|
| 0 | 2 |
| 1 | 4 |
| 2 | 6 |
| 3 | 8 |
| 4 | 10 |
| 5 | 12 |
| 6 | 15 |
| 7 | N/A |
| 8 | N/A |
| 9 | N/A |
| 10 | N/A |
| 11 | N/A |
| 12 | N/A |
| 13 | N/A |
| 14 | N/A |
| 15 | N/A |

$$C_v = \begin{cases} vN_{cs} & v = 0, 1, \ldots, \lfloor N_{ZC}/N_{CS} \rfloor - 1, N_{CS} \ne 0 & \text{for unrestricted sets} \\ 0 & N_{CS} = 0 & \text{for unrestricted sets} \\ d_{start}\lfloor v/n_{shift}^{RA} \rfloor + (v \bmod n_{shift}^{RA})N_{CS} & v = 0, 1, \ldots, n_{shift}^{RA} n_{group}^{RA} + \overline{n}_{shift}^{RA} - 1 & \text{for restricted sets} \end{cases} \quad \text{Equation 2}$$

The parameter zeroCorrelationZoneConfig is provided by higher layers. The parameter High-speed-flag provided by higher layers determines if unrestricted set or restricted set shall be used.

The variable du is the cyclic shift corresponding to a Doppler shift of magnitude 1/TSEQ and is given by the following equation.

$$d_u = \begin{cases} p & 0 \leq p < N_{ZC}/2 \\ N_{ZC} - p & \text{otherwise} \end{cases} \quad \text{Equation 3}$$

p is the smallest non-negative integer that fulfils (pu) mod NZC=1. The parameters for restricted sets of cyclic shifts depend on du. For NZC≤du<NZC/3, the parameters are given by the following equation.

$$n_{shift}^{RA} = \lfloor d_u / N_{CS} \rfloor \quad \text{Equation 4}$$
$$d_{start} = 2d_u + n_{shift}^{RA} N_{CS}$$
$$n_{group}^{RA} = \lfloor N_{ZC} / d_{start} \rfloor$$
$$\overline{n}_{shift}^{RA} = \max(\lfloor (N_{ZC} - 2d_u - n_{group}^{RA} d_{start}) / N_{CS} \rfloor, 0)$$

For NZC/3≤du<(NZC−NCS)/2, the parameters are given by the following equation.

$$n_{shift}^{RA} = \lfloor (N_{CS} - 2d_u) / N_{CS} \rfloor \quad \text{Equation 5}$$
$$d_{start} = N_{CS} - 2d_u + n_{shift}^{RA} N_{CS}$$
$$n_{group}^{RA} = \lfloor d_u / d_{start} \rfloor$$
$$\overline{n}_{shift}^{RA} = \min(\max(\lfloor (d_u - n_{group}^{RA} d_{start}) / N_{CS} \rfloor, 0), n_{shift}^{RA})$$

For all other values of du, there are no cyclic shifts in the restricted set.

The time-continuous random access signal s(t) which is the baseband signal of RACH is defined by the following Equation.

$$s(t) = \beta_{PRACH} \sum_{k=0}^{N_{ZC}-1} \sum_{n=0}^{N_{ZC}-1} x_{u,v}(n) \cdot e^{-j\frac{2\pi nk}{N_{ZC}}} \cdot e^{j2\pi(k+\varphi+K(k_0+1/2))\Delta f_{RA}(t-T_{CP})} \quad \text{Equation 6}$$

where 0≤t<TSEQ-TCP, OPRACH is an amplitude scaling factor in order to conform to the transmit power specified in 3GPP TS 36.211, and k0=nRAPRBNRBsc−NULRBNRBsc/2. NRBsc denotes the number of subcarriers constituting one resource block (RB). NULRB denotes the number of RBs in a UL slot and depends on a UL transmission bandwidth. The location in the frequency domain is controlled by the parameter nRAPRB is derived from the section 5.7.1 of 3GPP TS 36.211. The factor K=Δf/ΔfRA accounts for the difference in subcarrier spacing between the random access preamble and uplink data transmission. The variable ΔfRA, the subcarrier spacing for the random access preamble, and the variable φ, a fixed offset determining the frequency-domain location of the random access preamble within the physical resource blocks, are both given by the following table.

TABLE 7

| Preamble format | ΔfRA |
|---|---|
| 0~3 | 1250 Hz |
| 4 | 7500 Hz |

In the LTE/LTE-A system, a subcarrier spacing Δf is 15 kHz or 7.5 kHz. However, as given by Table 7, a subcarrier spacing ΔfRA for a random access preamble is 1.25 kHz or 0.75 kHz.

Figure 4:
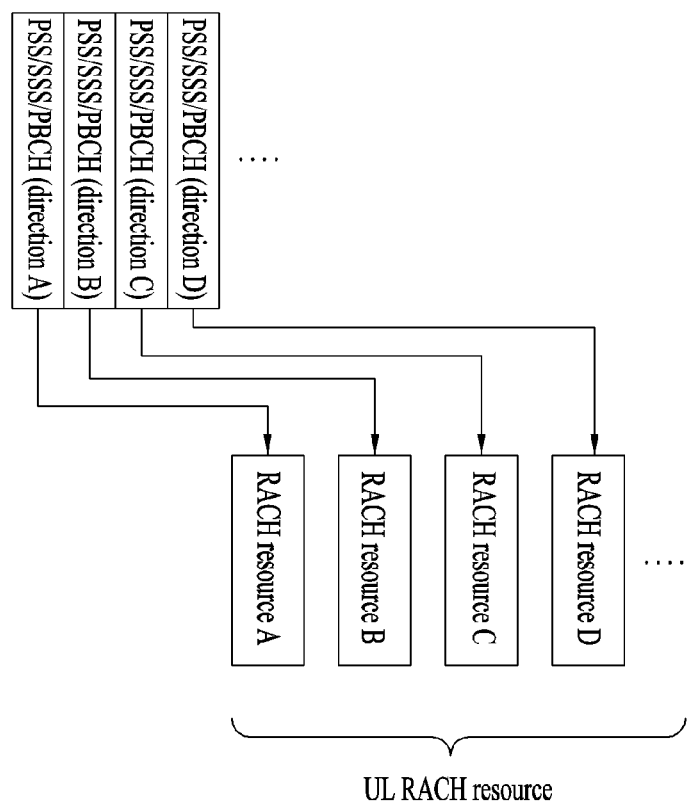
FIG. 4 illustrates SS block transmission and RACH resources linked to SS blocks.

FIG. 4 illustrates transmission of an SS block and a RACH resource linked to the SS block.

To communicate with one UE, the gNB should acquire an optimal beam direction between the gNB and the UE and should continuously track the optimal beam direction because the optimal beam direction is changed as the UE moves. A procedure of acquiring the optimal beam direction between the gNB and the UE is referred to as a beam acquisition procedure and a procedure of continuously tracking the optimal beam direction is referred to as a beam tracking procedure. The beam acquisition procedure is needed for 1) initial access in which the UE first attempts to access the gNB, 2) handover in which the UE is handed over from one gNB to another gNB, or 3) beam recovery for recovering from a state in which the UE and gNB cannot maintain an optimal communication state or enter a communication impossible state, i.e., beam failure, as a result of losing an optimal beam while performing beam tracking for searching for the optimal beam between the UE and the gNB.

In the case of the NR system which is under development, a multi-stage beam acquisition procedure is under discussion, for beam acquisition in an environment using multiple beams. In the multi-stage beam acquisition procedure, the gNB and the UE perform connection setup using a wide beam in an initial access stage and, after connection setup is ended, the gNB and the UE perform communication with optimal quality using a narrow band. In the present invention, although various methods for beam acquisition of the NR system are mainly discussed, the most actively discussed method at present is as follows.

1) The gNB transmits an SS block per wide beam in order for the UE to search for the gNB in an initial access procedure, i.e., performs cell search or cell acquisition, and to search for an optimal wide beam to be used in a first stage of beam acquisition by measuring channel quality of each wide beam. 2) The UE performs cell search for an SS block per beam and performs DL beam acquisition using a cell detection result of each beam. 3) The UE performs a RACH procedure in order to inform the gNB that the UE will access the gNB that the UE has discovered. 4) The gNB connects or associates the SS block transmitted per beam and a RACH resource to be used for RACH transmission, in order to cause the UE to inform the gNB of a result of the RACH procedure and simultaneously a result of DL beam acquisition (e.g., beam index) at a wide beam level. If the UE performs the RACH procedure using a RACH resource connected to an optimal beam direction that the UE has discovered, the gNB obtains information about a DL beam suitable for the UE in a procedure of receiving a RACH preamble.

<Beam Correspondence (BC)>

In a multi-beam environment, whether a UE and/or a TRP can accurately determine a transmission (Tx) or reception (Rx) beam direction between the UE and the TRP is problematic. In the multi-beam environment, signal transmission repetition or beam sweeping for signal reception may be considered according to a Tx/Rx reciprocal capability of the TRP (e.g., eNB) or the UE. The Tx/Rx reciprocal capability is also referred to as Tx/Rx beam correspondence (BC) in the TRP and the UE. In the multi-beam environment, if the Tx/Rx reciprocal capability in the TRP or the UE does not hold, the UE may not transmit a UL signal in a beam direction in which the UE has received a DL signal because an optimal path of UL may be different from an optimal path of DL. Tx/Rx BC in the TRP holds, if the TRP can determine a TRP Rx beam for UL reception based on DL measurement of UE for one or more Tx beams of the TRP and/or if the TRP can determine a TRP Tx beam for DL transmission based on UL measurement for one or more Rx beams of the TRP. Tx/Rx BC in the UE holds if the UE can determine a UE Rx beam for UL transmission based on DL measurement of UE for one or more Rx beams of the UE and/or if the UE can determine a UE Tx beam for DL reception according to indication of the TRP based on UL measurement for one or more Tx beams of the UE.

In the LTE system and the NR system, a RACH signal used for initial access to the gNB, i.e., initial access to the gNB through a cell used by the gNB, may be configured using the following elements.

Cyclic prefix (CP): This element serves to prevent interference generated from a previous/front (OFDM) symbol and group RACH preamble signals arriving at the gNB with various time delays into one time zone. That is, if the CP is configured to match a maximum radius of a cell, RACH preambles that UEs in the cell have transmitted in the same resource are included in a RACH reception window corresponding to the length of RACH preambles configured by the gNB for RACH reception. A CP length is generally set to be equal to or greater than a maximum round trip delay.

Preamble: A sequence used by the gNB to detect signal transmission is defined and the preamble serves to carry this sequence.

Guard time (GT): This element is defined to cause a RACH signal arriving at the gNB with delay from the farthest distance from the gNB on RACH coverage not to create interference with respect to a signal arriving after a RACH symbol duration. During this GT, the UE does not transmit a signal so that the GT may not be defined as the RACH signal.

Figure 5:
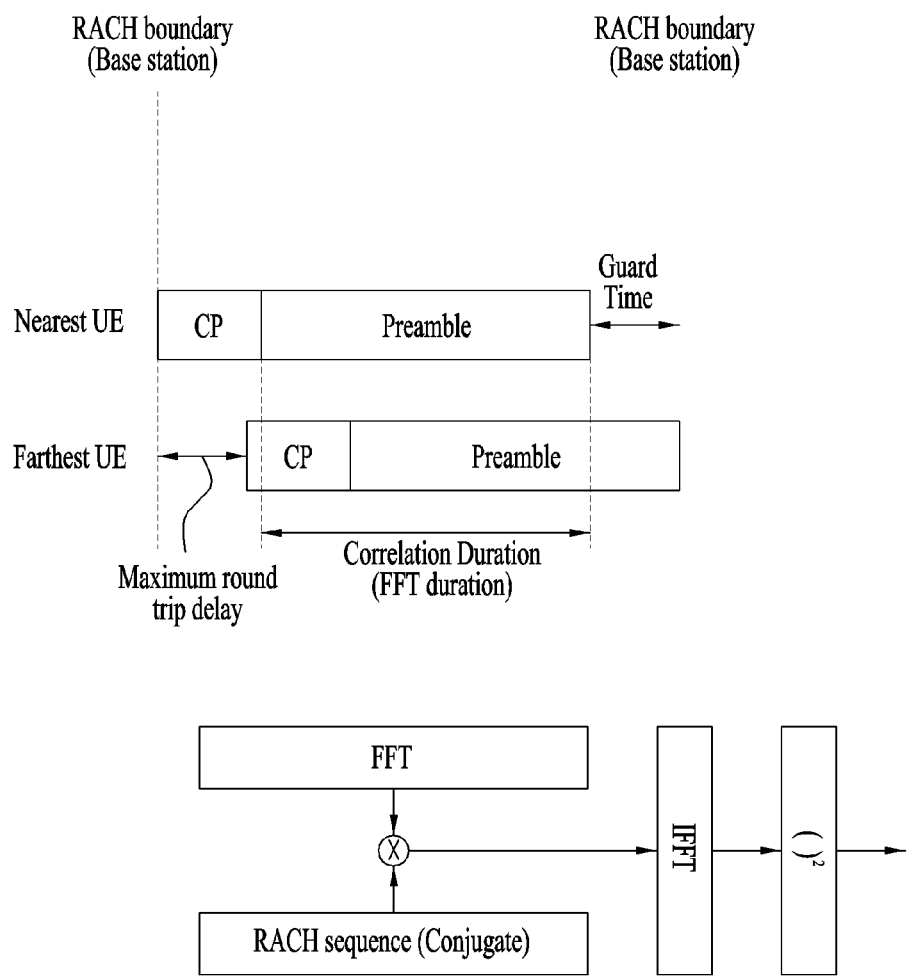
FIG. 5 illustrates a configuration/format of a random access channel (RACH) preamble and a receiver function.

FIG. 5 illustrates configuration/format of a RACH preamble and a receiver function.

The UE transmits a RACH signal through a designated RACH resource at a system timing of the gNB obtained through an SS. The gNB receives signals from multiple UEs. Generally, the gNB performs the procedure illustrated in FIG. 5 for RACH signal reception. Since a CP for the RACH signal is set to a maximum round trip delay or more, the gNB may configure an arbitrary point between the maximum round trip delay and the CP length as a boundary for signal reception. If the boundary is determined as a start point for signal reception and if correlation is applied to a signal of a length corresponding to a sequence length from the start point, the gNB may acquire information as to whether the RACH signal is present and information about the CP.

If a communication environment operated by the gNB such as a millimeter band uses multiple beams, the RACH signal arrives at the eNB from multiple directions and the gNB needs to detect the RACH preamble (i.e., PRACH) while sweeping beam directions to receive the RACH signal arriving from multiple directions. As mentioned above, when analog BF is used, the gNB performs RACH reception only in one direction at one timing. For this reason, it is necessary to design the RACH preamble and a RACH procedure so that the gNB may properly detect the RACH preamble. The present invention proposes the RACH preamble and/or the RACH procedure for a high frequency band to which the NR system, especially, BF, is applicable in consideration of the case in which BC of the gNB holds and the case in which BC does not hold.

Figure 6:
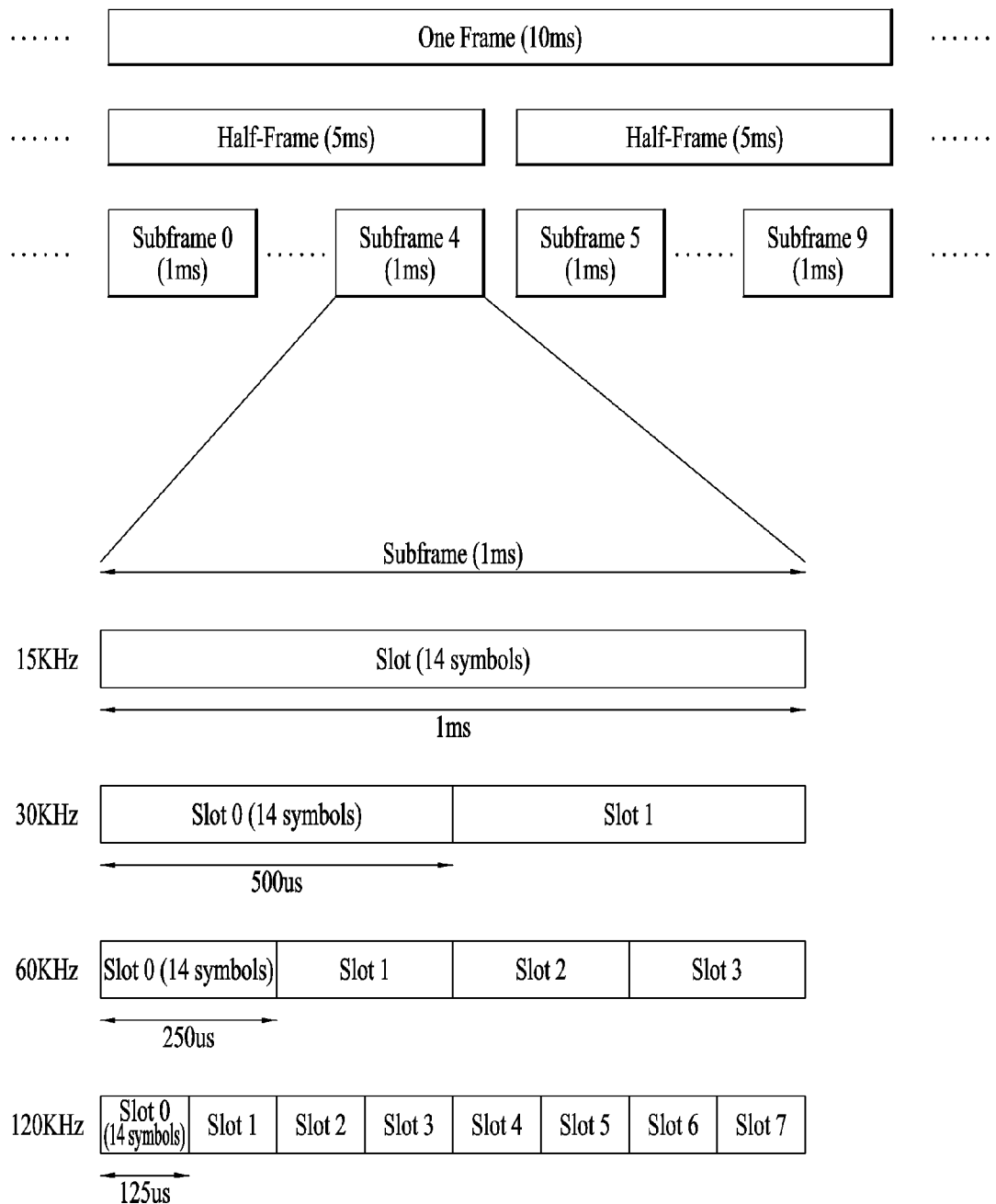
FIGS. 6 to 8 are views illustrating structures of a radio frame and slots used in the NR system.

FIG. 6 illustrates a structure of a radio frame used in NR.

In NR, UL and DL transmissions are configured in frames. The radio frame has a length of 10 ms and is defined as two 5 ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

Table 8 illustrates that the number of symbols per slot, the number of slots per frame, and the number of slots per subframe vary according to the SCS when the normal CP is used.

TABLE 8

| SCS (15*2^u) | Nslotsymb | Nframe, uslot | Nsubframe, uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*Nslotsymb: Number of symbols in a slot
*Nframe, uslot: Number of slots in a frame
*Nsubframe, uslot: Number of slots in a subframe Table 9 illustrates that the number of symbols per slot, the number of slots per frame, and the number of slots per subframe vary according to the SCS when the extended CP is used.

TABLE 9

| SCS (15*2^u) | Nslotsymb | Nframe, uslot | Nsubframe, uslot |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 7:
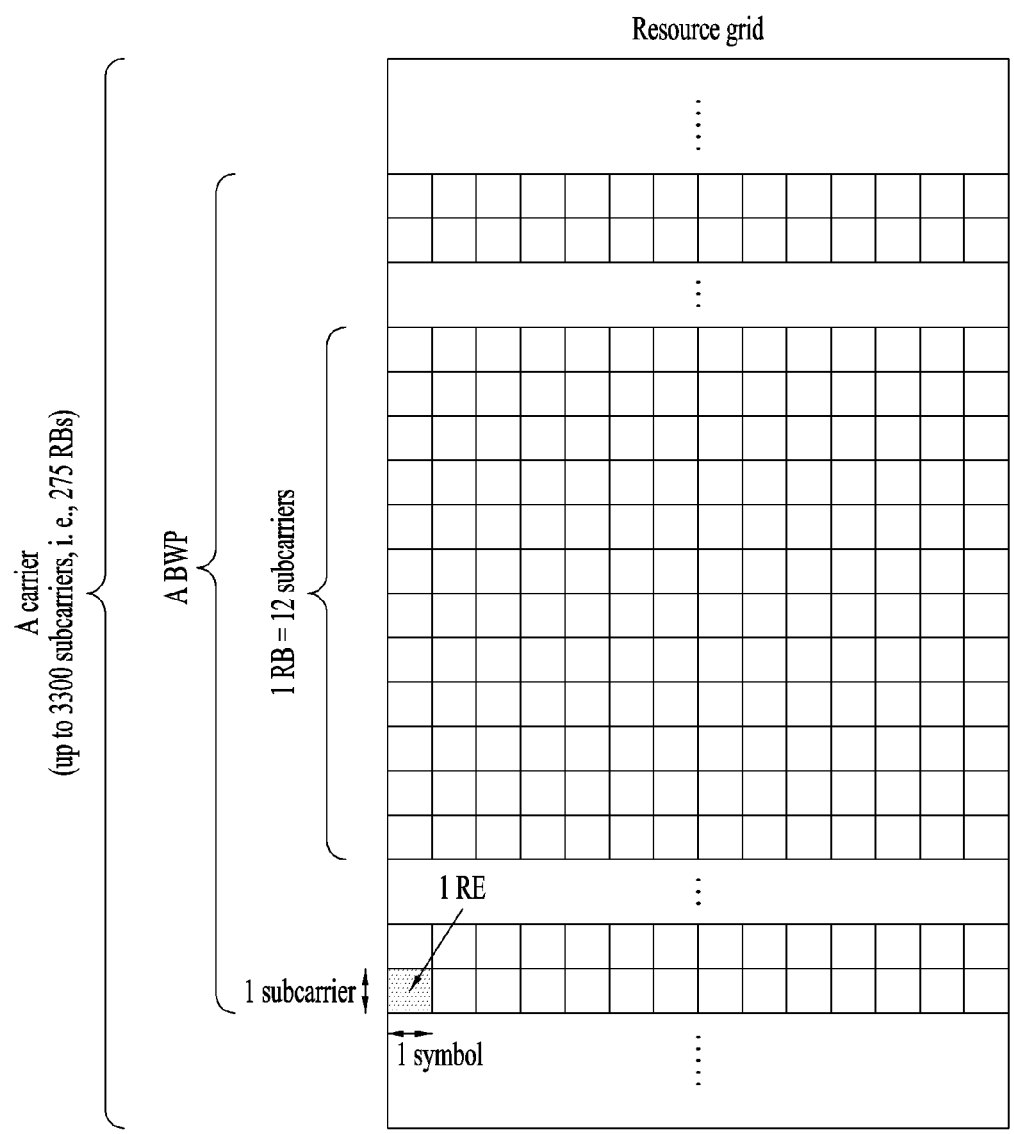

FIG. 7 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., five) BWPs. Data communication is performed through an activated BWP, and only one BWP may be activated for one UE. In the resource grid, each element is referred to as a resource element (RE), and one complex symbol may be mapped thereto.

Figure 8:
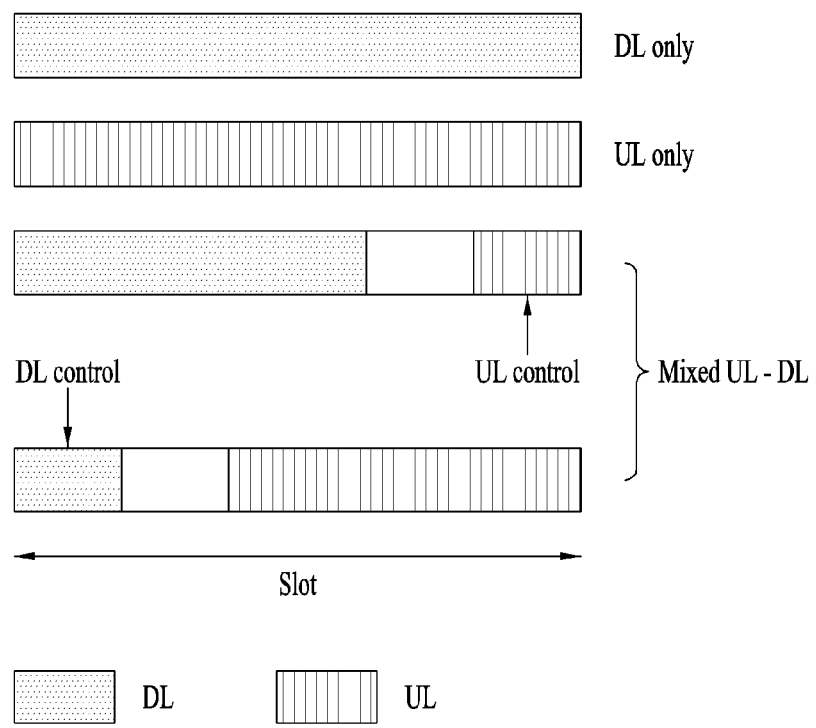

FIG. 8 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.
1. DL only configuration
2. UL only configuration
3. Mixed UL-DL configuration
    DL region+Guard period (GP)+UL control region
    DL control region+GP+UL region
        DL region: (i) DL data region, (ii) DL control region+DL data region
        UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

For a 5G mobile communication system under discussion, a technique of using an ultra-high frequency band, that is, a millimeter frequency band at or above 6 GHz is considered in order to transmit data to a plurality of users at a high transmission rate in a wide frequency band. The 3GPP calls this technique NR, and thus a 5G mobile communication system will be referred to as an NR system in the present disclosure. However, the millimeter frequency band has the frequency property that a signal is attenuated too rapidly according to a distance due to the use of too high a frequency band. Accordingly, the NR system using a frequency band at or above at least 6 GHz employs a narrow beam transmission scheme in which a signal is transmitted with concentrated energy in a specific direction, not omni-directionally, to thereby compensate for the rapid propagation attenuation and thus overcome the decrease of coverage caused by the rapid propagation attenuation. However, if a service is provided by using only one narrow beam, the service coverage of one gNB becomes narrow, and thus the gNB provides a service in a wideband by collecting a plurality of narrow beams.

As a wavelength becomes short in the millimeter frequency band, that is, millimeter wave (mmW) band, it is possible to install a plurality of antenna elements in the same area. For example, a total of 100 antenna elements may be installed at (wavelength) intervals of 0.5 lamda in a 30-GHz band with a wavelength of about 1 cm in a two-dimensional (2D) array on a 5 by 5 cm panel. Therefore, it is considered to increase coverage or throughput by increasing a beamforming gain through use of a plurality of antenna elements in mmW.

To form a narrow beam in the millimeter frequency band, a beamforming scheme is mainly considered, in which a gNB or a UE transmits the same signals with appropriate phase differences through multiple antennas, to thereby increase energy only in a specific direction. Such beamforming schemes include digital beamforming for generating a phase difference between digital baseband signals, analog beamforming for generating a phase difference between modulated analog signals by using a time delay (i.e., a cyclic shift), and hybrid beamforming using both digital beamforming and analog beamforming. If a TXRU is provided per antenna element to enable control of transmission power and a phase per antenna, independent beamforming per frequency resource is possible. However, installation of TXRUs for all of about 100 antenna elements is not effective in terms of cost. That is, to compensate for rapid propagation attenuation in the millimeter frequency band, multiple antennas should be used, and digital beamforming requires as many RF components (e.g., digital to analog converters (DACs), mixers, power amplifiers, and linear amplifiers) as the number of antennas. Accordingly, implementation of digital beamforming in the millimeter frequency band faces the problem of increased cost of communication devices. Therefore, in the case where a large number of antennas are required as in the millimeter frequency band, analog beamforming or hybrid beamforming is considered. In analog beamforming, a plurality of antenna elements are mapped to one TXRU, and the direction of a beam is controlled by an analog phase shifter. A shortcoming with this analog beamforming scheme is that frequency selective beamforming (BF) cannot be provided because only one beam direction can be produced in a total band. Hybrid BF stands between digital BF and analog BF, in which B TXRUs fewer than Q antenna elements are used. In hybrid BF, the directions of beams transmittable at the same time is limited to or below B although the number of beam directions is different according to connections between B TXRUs and Q antenna elements.

Digital BF performs signal processing on a digital baseband signal that is to be transmitted or is received as mentioned above, and therefore it may transmit or receive signals in multiple directions at the same time using multiple beams. In contrast, analog BF performs beamforming with an received analog signal or an analog signal to be transmitted in a modulated state, and therefore it cannot simultaneously transmit or receive signals in multiple directions beyond the range covered by one beam. In general, a gNB communicates with multiple users at the same time using broadband transmission or multi-antenna characteristics. When the gNB uses analog or hybrid BF and forms an analog beam in one beam direction, the gNB is allowed to communicate only with users included in the same analog beam direction due to the characteristics of analog BF. A RACH resource allocation scheme and a scheme of resource utilization in the gNB according to the present invention to be described later are proposed in consideration of constraints resulting from the characteristics of analog BF or hybrid BF.

Figure 9:
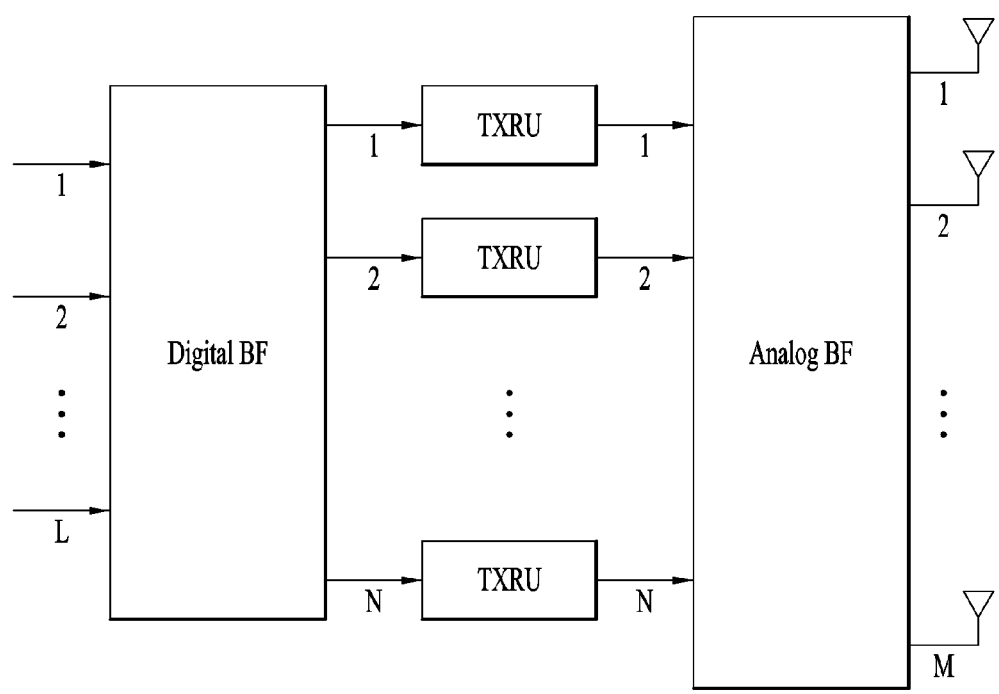
FIG. 9 is a view illustrating exemplary connection schemes between transceiver units (TXRUs) and antenna elements.

FIG. 9 abstractly illustrates a hybrid beamforming structure in terms of TXRUs and physical antennas.

For the case where multiple antennas are used, hybrid BF with digital BF and analog BF in combination has emerged. Analog BF (or RF BF) is an operation of performing precoding (or combining) in an RF unit. Due to precoding (combining) in each of a baseband unit and an RF unit, hybrid BF offers the benefit of performance close to the performance of digital BF, while reducing the number of RF chains and the number of DACs (or analog to digital converters (ADCs). For the convenience' sake, a hybrid BF structure may be represented by N TXRUs and M physical antennas. Digital BF for L data layers to be transmitted by a transmission end may be represented as an N-by-N matrix, and then N converted digital signals are converted to analog signals through TXRUs and subjected to analog BF represented as an M-by-N matrix. In FIG. 8, the number of digital beams is L, and the number of analog beams is N. Further, it is considered in the NR system that a gNB is configured to change analog BF on a symbol basis so as to more efficiently support BF for a UE located in a specific area. Further, when one antenna panel is defined by N TXRUs and M RF antennas, introduction of a plurality of antenna panels to which independent hybrid BF is applicable is also considered. As such, in the case where a gNB uses a plurality of analog beams, a different analog beam may be preferred for signal reception at each UE. Therefore, a beam sweeping operation is under consideration, in which for at least an SS, system information, and paging, a gNB changes a plurality of analog beams on a symbol basis in a specific slot or SF to allow all UEs to have reception opportunities.

Figure 10:
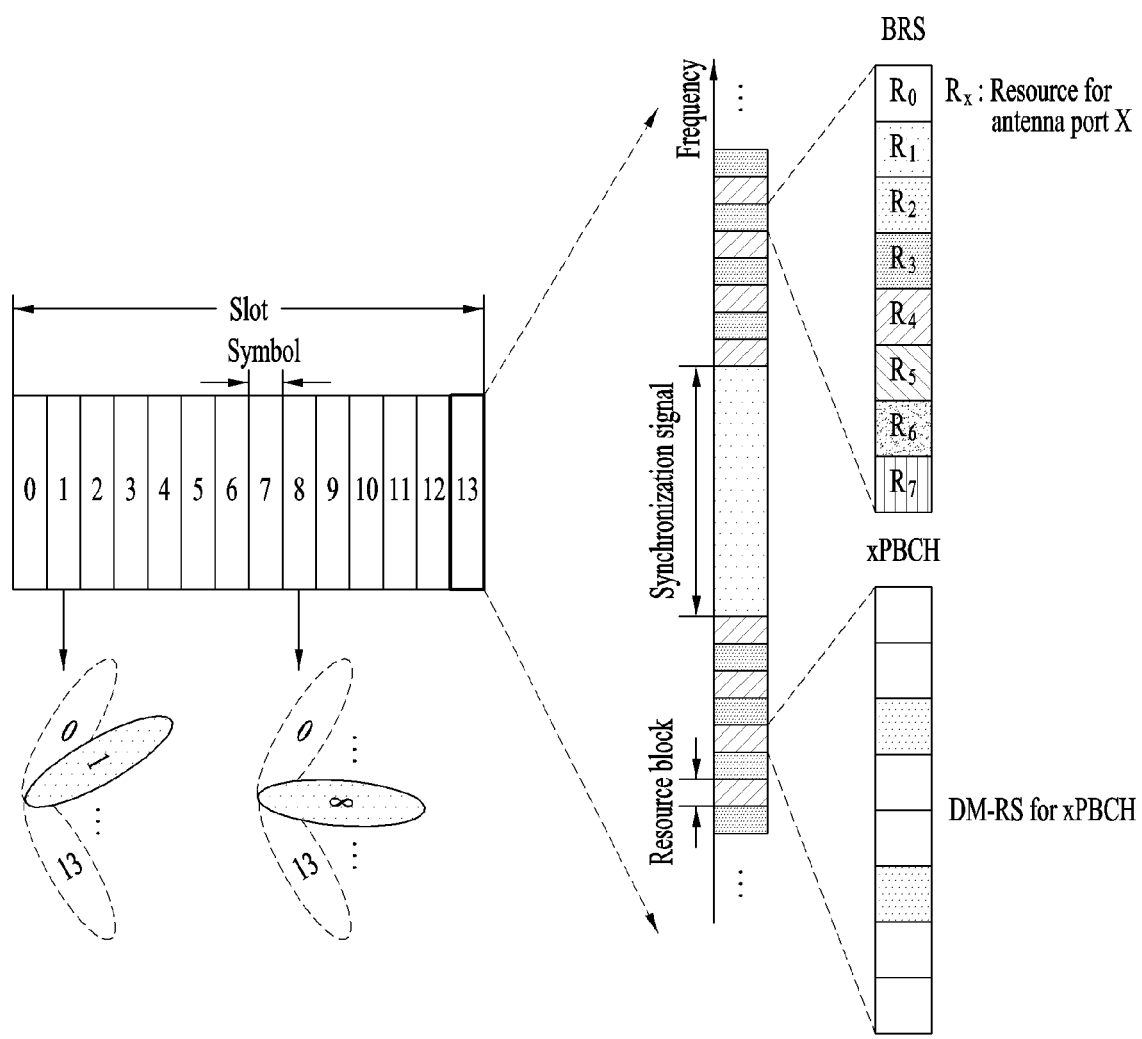
FIG. 10 is a view illustrating beam sweeping for a synchronization signal and system information during downlink (DL) transmission.

FIG. 10 is a view illustrating beam sweeping for an SS and system information during DL transmission. In FIG. 10, physical resources or a physical channel which broadcasts system information of the New RAT system is referred to as an xPBCH. Analog beams from different antenna panels may be transmitted simultaneously in one symbol, and introduction of a beam reference signal (BRS) transmitted for a single analog beam corresponding to a specific antenna panel as illustrated in FIG. 10 is under discussion in order to measure a channel per analog beam. BRSs may be defined for a plurality of antenna ports, and each antenna port of the BRSs may correspond to a single analog beam. Unlike the BRSs, the SS or the xPBCH may be transmitted for all analog beams included in an analog beam group so that any UE may receive the SS or the xPBCH successfully.

Figure 11:
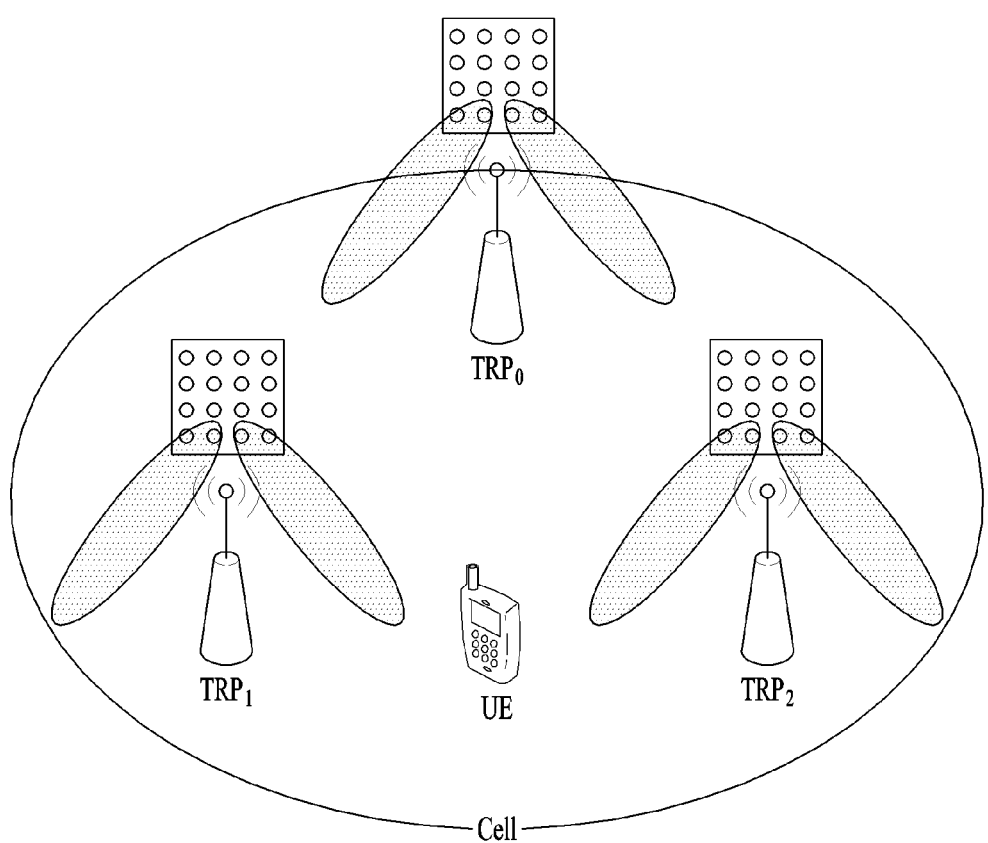
FIG. 11 is a view illustrating an exemplary cell in an NR system.

FIG. 11 is a view illustrating an exemplary cell in the NR system.

Referring to FIG. 11, compared to a wireless communication system such as legacy LTE in which one eNB forms one cell, configuration of one cell by a plurality of TRPs is under discussion in the NR system. If a plurality of TRPs form one cell, even though a TRP serving a UE is changed, seamless communication is advantageously possible, thereby facilitating mobility management for UEs.

Compared to the LTE/LTE-A system in which a PSS/SSS is transmitted omni-directionally, a method for transmitting a signal such as a PSS/SSS/PBCH through BF performed by sequentially switching a beam direction to all directions at a gNB applying mmWave is considered. The signal transmission/reception performed by switching a beam direction is referred to as beam sweeping or beam scanning. In the present disclosure, "beam sweeping" is a behavior of a transmission side, and "beam scanning" is a behavior of a reception side. For example, if up to N beam directions are available to the gNB, the gNB transmits a signal such as a PSS/SSS/PBCH in the N beam directions. That is, the gNB transmits an SS such as the PSS/SSS/PBCH in each direction by sweeping a beam in directions available to or supported by the gNB. Or if the gNB is capable of forming N beams, the beams may be grouped, and the PSS/SSS/PBCH may be transmitted/received on a group basis. One beam group includes one or more beams. Signals such as the PSS/SSS/PBCH transmitted in the same direction may be defined as one SS block (SSB), and a plurality of SSBs may exist in one cell. If a plurality of SSBs exist, an SSB index may be used to identify each SSB. For example, if the PSS/SSS/PBCH is transmitted in 10 beam directions in one system, the PSS/SSS/PBCH transmitted in the same direction may form an SSB, and it may be understood that 10 SSBs exist in the system. In the present disclosure, a beam index may be interpreted as an SSB index.

Hereinafter, a method for determining a starting orthogonal frequency division multiplexing (OFDM) symbol, a PRACH occasion, and a PRACH slot for PRACH transmission/reception according to the present invention will be described in detail.

Prior to a detailed description, operations of a UE and a base station according to the present invention will be schematically described with reference to FIGS. 12 to 14.

Figure 12:
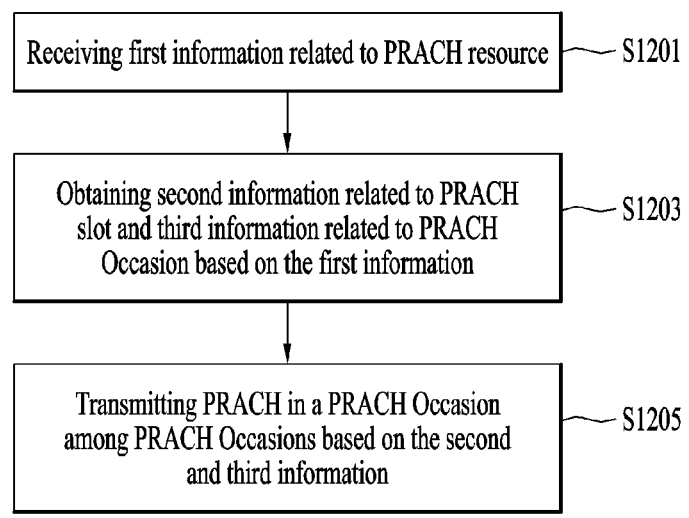
FIGS. 12 to 14 illustrate a procedure for transmitting and receiving a physical random access channel (PRACH) according to an embodiment of the present invention.

Referring to FIG. 12, the UE receives information about PRACH resources, i.e., PRACH configuration information (S1201), and acquires information about a starting OFDM symbol for a PRACH, a PRACH slot, and the number of PRACH occasions included in the PRACH slot, based on the information about the PRACH resources (S1203). Here, the method for acquiring the information about the starting OFDM symbol for the PRACH, the PRACH slot, and the number of PRACH occasions included in the PRACH slot based on the information about the PRACH resources in operation S1203 may be configured in accordance with specific embodiments described below.

Thereafter, the UE transmits a PRACH on one of the PRACH occasions based on the acquired information with reference to a received SS block or the like (S1205).

Figure 13:
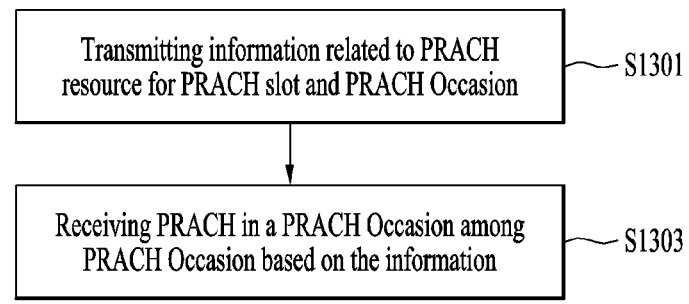
Figure 14:
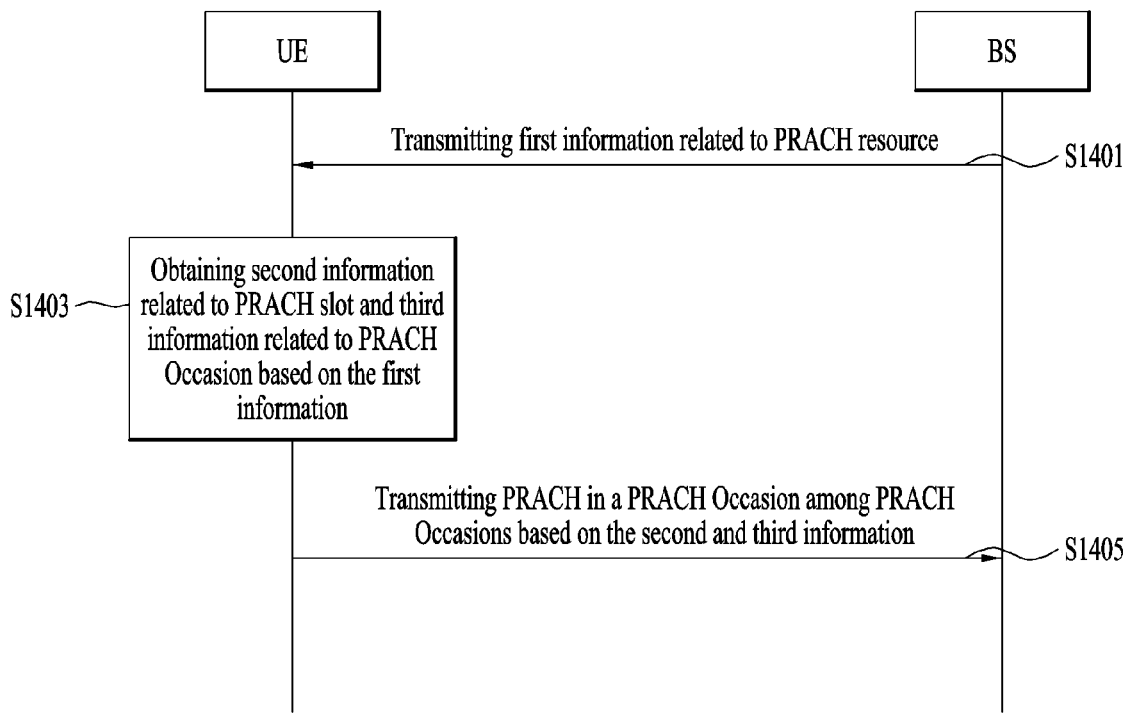

Referring to FIG. 13, regarding the operation of the UE according to FIG. 12, the BS transmits information about the PRACH resources, that is, the PRACH configuration information to the UE (S1301), and receives a PRACH through one of the PRACH occasions configured based on the information about the PRACH resources (S1303). In this regard, the method for determining the PRACH occasions configured based on the information about the PRACH resources may be based on the specific embodiments described below.

Schematic operations according to the embodiments of the present invention will be described with reference to FIG. 14. The BS transmits information about the PRACH resources, i.e., PRACH configuration information to the UE (S1401), and the UE acquires information about the starting OFDM symbol for a PRACH, a PRACH slot and the number of PRACH occasions included in the PRACH slot based on the received information about the PRACH resources (S1403). Here, the method for acquiring the information about the starting OFDM symbol for the PRACH, the PRACH slot, and the number of PRACH occasions included in the PRACH slot based on the information about the PRACH resources in operation S1403 may be configured in accordance with specific embodiments described below.

Thereafter, the UE transmits the PRACH on one of the PRACH occasions based on the acquired information with reference to a received SS block or the like (S1405).

Hereinafter, the PRACH configuration and the PRACH procedure for determining a PRACH occasion and the like in operations S1203 and S1403 will be described in detail.

The remaining minimum system information (RMSI) described in the embodiments disclosed below is system information acquired based on a master information block (MIB), which is acquired on the PBCH, and may be referred to as system information block 1 (SIB1). On the other hand, other system information (OSI) refers to system information except for the MIB and the RMSI, which are minimum system information.

In addition, CORESET refers to a region including monitoring occasions in which the UE can monitor PDCCH candidates. That is, it means one or more search spaces or a search space set for monitoring the PDCCH.

1. Starting OFDM Symbol and Number of Time-domain PRACH Occasions (1) Starting OFDM Symbol When a semi-static UL/DL configuration is indicated by the RMSI, PRACH occasions are present in the uplink portion.

In other words, when PRACH occasions are configured in slots indicated as one of DL/UL/Unknown/Flexible in the UL/DL configuration indicated by the RMSI, the PRACH occasions allocated to the slots indicated as UL are valid.

Among the PRACH occasions allocated to the slots designated as Flexible, PRACH occasions allocated to an OFDM symbol positioned following a certain gap after an SS/PBCH block or downlink is received may be valid.

When a semi-static UL/DL configuration is indicated by the OSI, the symbol index of an unpaired spectrum indicated by the semi-static UL/DL configuration is a physical symbol index. According to the NR standard specification 38.321, information about a cell-specific UL/DL configuration is defined in the RMSI.

In the table for the PRACH configuration, the index of the starting OFDM symbol may be greater than 2, and the starting OFDM symbol index for a short sequence may be 0 or 2. In NR, a cell-specific semi-static UL/DL configuration may be composed of slots and OFDM symbols. That is, some OFDM symbols in the slot may be configured as OFDM symbols for uplink. When any slot is indicated as a PRACH slot, the UE may transmit a PRACH preamble in the PRACH slot.

Figure 15:
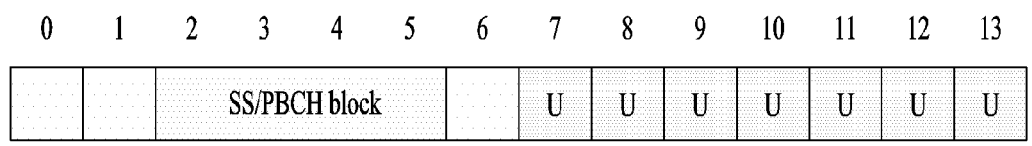

For example, as can be seen from FIG. 15, when a numerology different from that of the PRACH is used or the SS/PBCH block transmitted in a part of the slot or the PDSCH for the RMSI is transmitted in the earlier part of the slot, the PRACH preamble may be transmitted starting from OFDM symbol index #7. Accordingly, to prevent the PRACH occasion from colliding with the DL configuration and the SS/PBCH block, the starting OFDM symbol for the PRACH should be '7'.

In addition, if the number of uplink OFDM symbols available in one slot is less than 12, the PRACH may be transmitted in the second half of the slot configured for uplink transmission. If the number of uplink OFDM symbols available in one slot is less than 7, PRACH transmission is not allowed in the slot.

(2) Number of Time-Domain PRACH Occasions in PRACH Slot

The number of time-domain PRACH occasions in the PRACH slot for PRACH preamble format 'C0' is 4. However, since PRACH preamble format 'C0' has a duration of two OFDM symbols, the number of time-domain PRACH occasions for PRACH preamble format 'C0' should be changed to 6. Further, the number for PRACH preamble formats B1 and A1/B1 should be configured with one value, which may be 6.

That is, for preamble format B1, A1/B1 or C0, the maximum number of time-domain PRACH occasions per PRACH slot may be 6.

In NR, similar PRACH preamble formats such as formats A1, A1/B1, and B1 have been introduced, and each of the PRACH preamble formats may be used differently depending on the starting OFDM symbol. For example, as shown in FIG. 16(*a*), when the index of the starting OFDM symbol is '0', PRACH preamble formats A1, A2, and A3, which may provide a wider coverage than PRACH preamble formats A1/B1, A2/B2 and A3/B3, should be applied. In addition, one of the last two OFDM symbols may be used as a guard period, and the other OFDM symbol may be used for transmission of uplink signals such as PUCCH and SRS.

That is, when the index of the starting OFDM symbol is '0', PRACH preamble formats A1, A2, A3, B4, C0 and C2 may be applied.

Referring to FIG. 16(*b*), when the starting OFDM symbol index is '2', PRACH preamble formats A1/B1, A2/B2, and A3/B3 should be used because the guard OFDM symbol cannot be allocated to the last part of the PRACH slot. That is, when the starting OFDM symbol index is '2', 12 OFDM symbols may be used for PRACH transmission.

That is, when the index of the starting OFDM symbol is '2', PRACH preamble formats A1/B1, B1, A2/B2, A3/B3, B4, C0 and C2 may be used.

Similarly, referring to FIG. 16(*c*), when the starting OFDM symbol index is '7', PRACH preamble formats A1, A2 and A3 may be applied. That is, when the starting OFDM symbol index is '7', six OFDM symbols may be used for PRACH transmission, and the remaining one symbol may be used for SRS transmission or PUCCH transmission.

That is, when the starting OFDM symbol index is '7', PRACH preamble formats A1, A3, C0 and C4 may be used.

2. PRACH Configuration and Paired Spectrum for FR1

(1) Long Sequence-Based PRACH Preamble Formats

The PRACH configuration period may be any one of 10, 20, 40, 80 and 160 ms. It is necessary to define a PRACH configuration table for the periods of 40, 80 and 160 ms. The simplest way to define the periods is to modify the value of x according to the subframe number.

For example, the following values may be defined for each PRACH preamble format.

1) PRACH Preamble Formats 0, 1, and 3
x=16, y=1, subframe={{1}},{4},{7},{9}}
x=8, y=1, subframe={{1},{4},{7},{9}}
x=4, y=1, subframe={{1},{4},{7},{9}}
2) PRACH Preamble Format 2
x=16, y=1, subframe={1}
x=8, y=1, subframe={1}

For a PRACH configuration with a density less than 1, the UE may assume that the absolute value of the time difference between the radio frames I of the current cell and a target cell is less than 153600 Ts for the purpose of handover.

(2) Short Sequence-Based PRACH Preamble Formats

Short sequence-based PRACH preamble formats that may provide a wider coverage than the other short sequence-based PRACH preamble formats should be applied for FDD. That is, PRACH preamble formats A1, A2, A3, B4, C0 and C2 should be applied for FDD. In addition, for FDD, the PRACH preambles may be transmitted on the first OFDM symbol. Accordingly, for FDD, the starting OFDM symbol may be determined as a single value of '0'.

In the PRACH configuration, the short sequence based-PRACH preamble has a duration of 1 ms, and thus may have the same time position as the time position defined for PRACH preamble format 0.

For a PRACH configuration for the short sequence-based PRACH preamble formats, the following values may be applied.

x=16, y=1, subframe={{1}},{4},{7},{9}};
x=8, y=1, subframe={{1}},{4},{7},{9}};
x=4, y=1, subframe={{1},{4},{7},{9}};
x=2, y=1, subframe={{1},{4},{7},{9}};
x=1, y=1, subframe={{1},{4},{7},{1,6},{2,7},{3,8},{1,4,7},{2,5,8},{3,6,9},{0,2,4,6,8},{1,3,5,7,9},{0,1,2,3,4,5,6,7,8,9},{9}}.

In addition, for the short sequence-based PRACH preamble formats, the number of PRACH occasions in the PRACH slot may vary according to each PRACH preamble format as follows:

PRACH preamble format A1, C0: 6;
PRACH preamble format A2, C2: 3;
PRACH preamble format A3: 2;
PRACH preamble format B4: 1.

One PRACH slot is present in the subframe.

3. PRACH Preamble Formats for Unpaired Spectrum

For the unpaired spectrum, all PRACH preamble formats, that is, PRACH preamble formats A1, A1/B1, B1, A2, A2/B2, A3, A3/B3, B4, C0 and C2 may be applied. In the case of the unpaired spectrum, a starting OFDM symbol may be indicated in order to operate under conditions such as cell-specific UL/DL configuration, PDCCH resource reservation, and the like. That is, for the unpaired spectrum, the starting OFDCM symbol may be defined according to the PRACH preamble formats.

Specifically, PRACH preamble formats according to the starting OFDM symbol may be determined as follows.

For starting OFDM symbol index '0', PRACH preamble formats A1, A2, A3, B4, C0 and C2 may be used.

For starting OFDM symbol index '2', PRACH preamble formats A1/B1, B1, A2/B2, A3/B3, B4, C0 and C2 may be used.

If the number of available PRACH OFDM symbols in a slot is less than or equal to 12 and the starting OFDM symbol index is '7', PRACH preamble formats A1, A3, C0 and C2 may be used.

In addition, the maximum number of PRACH occasions that may be allocated to the PRACH slot may also be determined according to the PRACH preamble formats and the starting OFDM symbol.

Specifically, when the starting OFDM symbol index is '0' or '2', the number of PRACH occasions may be given according to each PRACH preamble format as follows:

PRACH preamble formats A1, A1/B1, and C0: 6;
PRACH preamble format B1, A2, C2: 3;
PRACH preamble format A2/B2, A3, A3/B3:2;
PRACH preamble format B4: 1.

When the starting OFDM symbol index is '7', the number of PRACH occasions may be given according to each PRACH preamble format as follows:

PRACH preamble format A1: 3;
PRACH preamble format A3: 1;
PRACH preamble format C0, C2: 2.

The number of PRACH slots present in a subframe in FR1 is 1, and the number of PRACH slots present in one slot in FR2 is 1.

In the NR system, the cell-specific semi-static DL/UL configuration includes the number of slots in a period and the number of OFDM symbols in a slot. The NR system also defines various values for the DL/UL configuration period. Thus, the positions of the UL slots are determined according to the cell-specific semi-static DL/UL configuration and the period. In addition, the number of UL slots is variable. Accordingly, it is important to correctly define the subframe index and slot index for a PRACH occasion. As one method, the PRACH occasions may be defined from the last point of the DL/UL configuration period because the UL slots are positioned from the last point of the period.

4. Unpaired Spectrum and PRACH Configuration in FR1

Considering a situation of SS/PBCH block transmission and an RMSI search space, at least two subframes may be allocated ahead of the slot as DL and 'Unknown', as shown in FIG. 17(a). In this case, when DL/UL is configured within a 5 ms period, a maximum of 6 subframes, for example, subframe indexes #2, #3, #4, #7, #8 and #9 may be used for the PRACH occasions. That is, a PRACH configuration may be established using candidate subframes for UL transmission.

For a PRACH configuration in FR1, the following values may be used:

x=16, y=1, subframe={{3},{4},{8},{9}};
x=8, y=1, subframe={{3},{4},{8},{9}};
x=4, y=1, subframe={{3},{4},{8},{9}};
x=2, y=1, subframe={{3},{4},{8},{9}};
x=1, y=1, subframe={{3},{4},{8},{9},{3,4},{8,9},{2,3,4},{7,8,9},{3,4,8,9},{5,6,7,8,9},{4,5,6,7,8,9}}.

(1) Long Sequence-Based PRACH Preamble

The random access configuration for FR 1 and the unpaired spectrum is currently defined as shown in Table 10 below.

TABLE 10

| Format 0, 3 | Format 1 | Format 2 |
|---|---|---|
| x = 16, y = 1, subframe = {{9}} | x = 16, y = 1, subframe = {{7}} | x = 16, y = 1, subframe = {{6}} |
| x = 8, y = 1, subframe = {{9}} | x = 8, y = 1, subframe = {{7}} | x = 8, y = 1, subframe = {{6}} |
| x = 4, y = 1, subframe = {{9}} | x = 4, y = 1, subframe = {{7}} | x = 4, y = 1, subframe = {{6}} |

TABLE 10-continued

| Format 0, 3 | Format 1 | Format 2 |
|---|---|---|
| x = 2, y = 0, subframe = {{4}, {9}} | x = 2, y = 0, subframe = {{7}} | x = 2, y = 0, subframe = {{6}} |
| x = 2, y = 1, subframe = {{4}, {9}} | x = 2, y = 1, subframe = {{7}} | x = 2, y = 1, subframe = {{6}} |
| x = 1, y = 0, subframe = {{1}, {2}, {3}, {4}, {5}, {6}, {7}, {8}, {9}, {1, 6}, {1, 6}, {2, 7}, {3, 8}, {4, 9}, {8, 9}, {3,4,8}, {3, 4, 9}, {4, 8, 9}, {7, 8, 9}, {1, 4, 6, 9}, {3, 4, 8, 9}, {6, 7, 8, 9}, {1, 3, 5, 7, 9}} | x = 1, y = 0, subframe = {{7}} | x = 1, y = 0, subframe = {{6}} |

Referring to Table 10, it can be seen that a total of 71 (=30+6+6+29) entries are allocated to the long sequence-based PRACH preamble.

It is necessary to define a configuration for a short sequence-based PRACH preamble for FR1 and the unpaired spectrum based on Table 10. For the configuration of short sequence-based PRACH preambles for FR1 and the paired spectrum, about 20 entries are used per PRACH preamble format.

Similarly, assuming that 20 entries are used per short sequence-based PRACH preamble format, at least 200 (=10 PRACH preamble formats×20 entries) are required for the short sequence-based RACH preamble, but the other entries except for the entries for the long sequence-based PRACH preamble formats are 185 (=256–71) entries, which are not sufficient as entries for the short sequence-based PRACH preamble.

In particular, considering that various values can be set for the starting OFDM symbol for the unpaired spectrum, more than 200 entries are required for the short sequence-based RPACH preamble. Accordingly, the entries for the configuration of the long sequence-based PRACH preamble should be reduced. Assuming about 200 entries for the short sequence-based PRACH preamble, about 54 entries may be allocated for the configuration of the long sequence-based PRACH preamble. 22, 6, 6 and 22 entries may be assumed for PRACH preamble formats 0, 1, 2, and 3, respectively.

Referring to FIG. 17(b) based on the description given above, when the DL/UL configuration is configured within the 5 ms and 10 ms periods in FR1, five subframes having indexes #3, #4, #7, #8 and #9 may be used for PRACH occasion allocation. In addition, in the case of a 2.5 ms period for a DL/UL configuration, two subframes having indexes #1 and #6 may be allocated for the PRACH occasion.

According to Table 10, for the SSB transmission region of the unpaired spectrum and the RMSI search space, subframes positioned at the beginning of the DL/UL configuration period may be allocated as DL and the 'Unknown'. In addition, the middle or last subframes may be allocated as a PRACH occasion.

For example, when the DL/UL configuration period is 10 ms, the last two subframes within a 10 ms duration (i.e., the subframes with indexes 8 and 9) may be used for the PRACH occasion. When the DL/UL configuration period is 2 ms, five subframes within the 10 ms duration (i.e., subframes with indexes 1, 3, 5, 7, and 9) may be used for the PRACH occasion. Accordingly, referring to Table 10, which is a PRACH configuration table for a long sequence, it can be seen that some entries are not suitable for the DL/UL configuration. In particular, the following entries are not suitable for the DL/UL configuration:

x=1, y=0, subframe={{1}},{2},{5},{6},{7},{1,6},{1,6},{2,7},{3,8},{3,4,8},{1,4,6,9}}.

The PRACH configuration as shown in Table 10 may help avoid collision between PRACH occasions of cells. However, in the serving cell, when the gNB transmits an SSB and a RSMI PDCCH/PDSCH at the beginning of the DL/UL configuration period, the probability of collision between the downlink channel for transmission of the SSB and RSMI PDCCH/PDSCH and the PRACH occasion may be higher. As a result, the number of PRACH occasions in the PRACH period may be reduced. Accordingly, it is recommended to remove at least some entries of Table 10.

In other words, it is recommended to modify the parameters of formats 0 and 3 in Table 10 as follows:

x=1, y=0, subframe={{3},{4},{8},{9},{4,9},{3,4},{8,9},{3,4,9},{4,8,9},{7,8,9},{3,4,8,9},{1,3,5,7,9}}.

Figure 19:
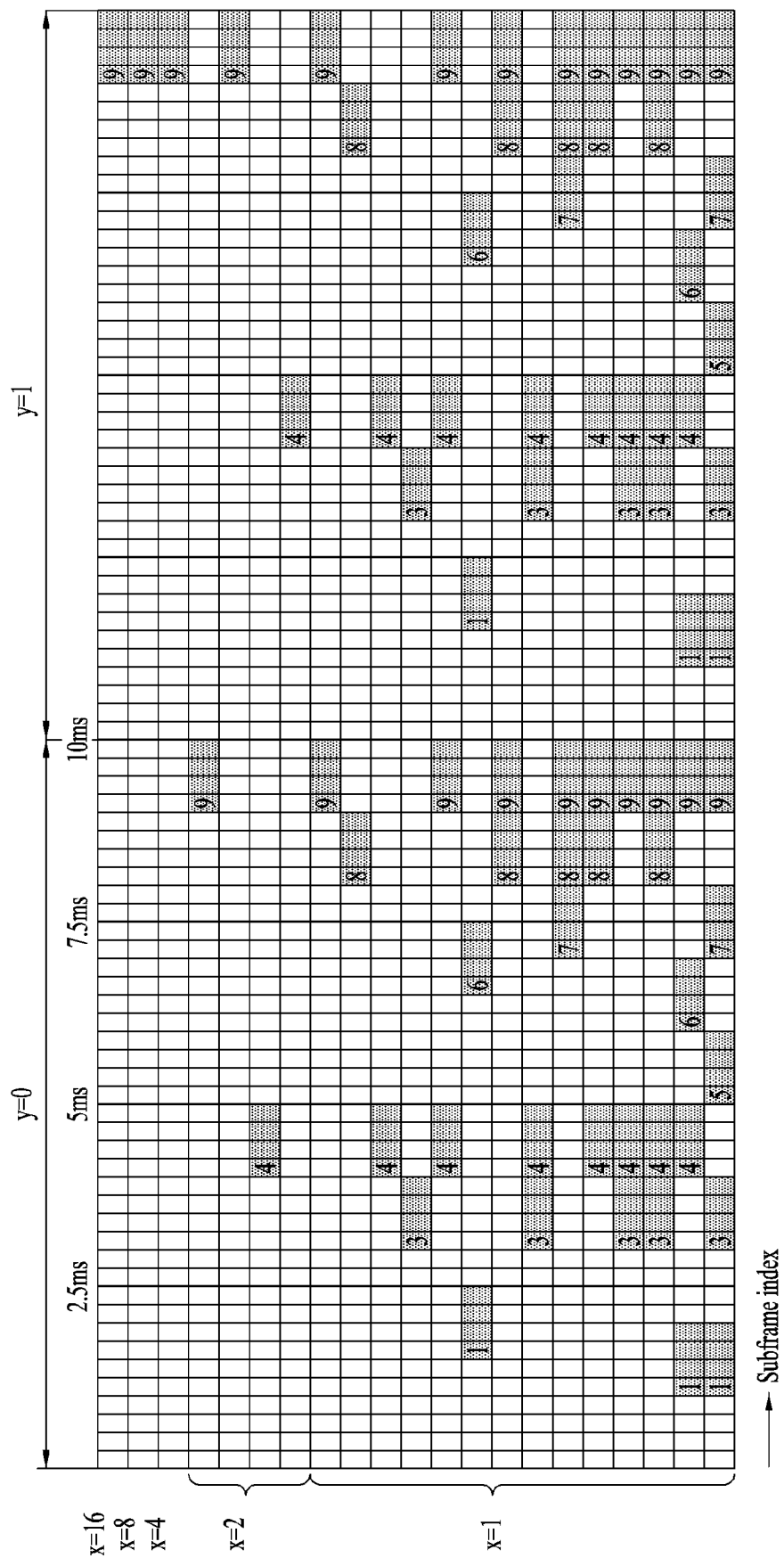
FIG. 19 is a diagram illustrating an embodiment in which a PRACH occasion on which a PRACH may be transmitted is configured.

The result of the modification as above is shown in FIG. 19. That is, FIG. 19 shows subframe indexes and an unpaired spectrum for PRACH occasions in FR1. Referring to FIG. 19, it can be seen that the modified indexes of the subframes are aligned at 2 ms, 2.5 ms, 5 ms, and 10 ms, which are the ends of the DL/UL configuration periods.

Referring to FIG. 19, subframes with indexes {3, 4}, which are two consecutive subframes, are useful when the DL/UL configuration period is 5 ms. Similarly, considering the DL/UL configuration of a 2.5 ms period, subframes with indexes {1,6} may be required. Thus, the starting OFDM symbol of subframes with indexes {1, 6} may be the OFDM symbol with index #7.

(2) Short Sequence-Based PRACH Preamble

For the short sequence-based PRACH preamble, subframe indexes for the PRACH occasion defined for the long sequence-based PRACH preamble should be considered. Thus, subframe indexes for the PRACH occasion may be modified at the top of the PRACH configuration according to the PRACH format.

Configuration parameters in the short sequence-based PRACH preamble may be given as follows for the PRACH configuration for the short sequence-based PRACH preamble:

x=16, y=1, subframe={{9}};
x=8, y=1, subframe={{9}};
x=4, y=1, subframe={{9}};
x=2, y=0, subframe={{4}},{{9}};
x=2, y=1, subframe={{4}},{{9}};
x=1, y=0, subframe={{3},{4},{8},{9},{1,6},{4,9},{3,4},{8,9},{3,4,9},{4,8,9},{7,8,9},{1,4,6,9},{3,4,8,9},{1,3,5,7,9}}.

Specifically, the configuration of the short sequence-based PRACH is configured to support various periods. However, since there is no entry for a long period in Table 10, configuration of long periods such as 160 ms, 80 ms, and 40 ms for some PRACH preamble formats such as formats A1, A2, A3, B1, B4, C0 and C4 is defined.

In addition, although more entries are allocated for long periods, two entries defined for other formats, i.e., slot index sets {2, 3, 4, 7, 8, 9} and {7, 9}, are not included in the entries for format A2 in the case of the 20 ms period. In order to align the configurations of the respective formats, more entries may be used as shown below.

1) Entries for PRACH Preamble Formats A2, B4, A1/B1, A2/B2, and A3/B4:

Entries for format A2 among the entries defined for other formats

TABLE 11

| A2 | 2 | 1 | 2,3,4,7,8,9 | 0 | 1 | 3 | 4 |
| A2 | 2 | 1 | 7,9 | 0 | 1 | 3 | 4 |

Entries for format B4 among the entries defined for the other formats

TABLE 12

| B4 | 2 | 1 | 9 | 0 | 1 | 1 | 12 |
| B4 | 1 | 0 | 9 | 0 | 1 | 1 | 12 |

Entries for format A1/B1 among the entries defined for configuration of long periods such as 160 ms, 80 ms and 40 ms, and other formats

TABLE 13

| A1/B1 | 16 | 1 | 9 | 2 | 2 | 6 | 2 |
| A1/B1 | 8 | 1 | 9 | 2 | 2 | 6 | 2 |
| A1/B1 | 4 | 1 | 9 | 2 | 1 | 6 | 2 |
| A1/B1 | 2 | 1 | 2,3,4,7,8,9 | 2 | 1 | 6 | 2 |
| A1/B1 | 1 | 0 | 3,4,8,9 | 2 | 1 | 6 | 2 |

Entries for format A2/B2 among the entries defined for configuration of long periods such as 160 ms, 80 ms and 40 ms, and other formats

TABLE 14

| A2/B2 | 16 | 1 | 9 | 2 | 2 | 3 | 4 |
| A2/B2 | 8 | 1 | 9 | 2 | 2 | 3 | 4 |
| A2/B2 | 4 | 1 | 9 | 2 | 1 | 3 | 4 |
| A2/B2 | 2 | 1 | 2,3,4,7,8,9 | 2 | 1 | 3 | 4 |
| A2/B2 | 2 | 1 | 7,9 | 2 | 1 | 3 | 4 |

Entries for format A3/B3 among the entries defined for configuration of long periods such as 160 ms, 80 ms and 40 ms, and other formats

TABLE 15

| A3/B3 | 16 | 1 | 9 | 0 | 2 | 2 | 6 |
| A3/B3 | 8 | 1 | 9 | 0 | 2 | 2 | 6 |
| A3/B3 | 4 | 1 | 9 | 0 | 2 | 2 | 6 |
| A3/B3 | 2 | 1 | 2,3,4,7,8,9 | 0 | 2 | 2 | 6 |
| A3/B3 | 1 | 0 | 3,4,8,9 | 0 | 1 | 2 | 6 |

5. Unpaired Spectrum and PRACH Configuration in FR2

Figure 18:
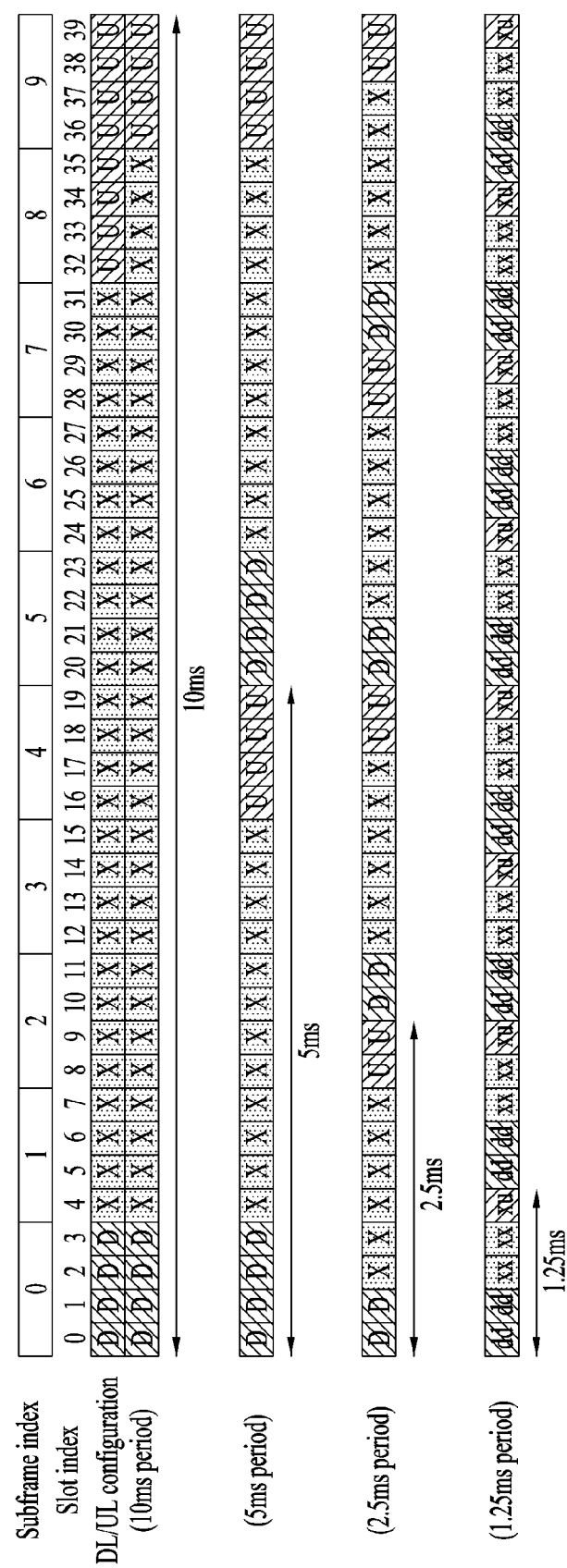

Referring to FIG. 18, in the case of FR2, a shorter period of 1.25 ms is defined for a 120 kHz subcarrier spacing, and the last slot of the period may be allocated for uplink. In addition, in the 2.5 ms period, the last slot of the period may be a candidate for a PRACH occasion. Therefore, four slots having at least indexes #9, #19, #29, and #39 may be allocated as PRACH occasions. Further, in FR2, the maximum number of SS/PBCH blocks is L=64, which is a considerably large number, and the RMSI search window occasion may be wide. Accordingly, the uplink slot for the PRACH occasion may be allocated to the last part of the 5 ms or 10 ms period.

Specifically, PRACH occasions according to the period of the cell-specific UL/DL configuration are given as follows.

In the case of the 1.25 ms period, the later halves of the eight slots having indexes #4, #9, #14, #19, #24, #29, #34, and #39 may be PRACH occasions available for PRACH transmission, and the eight slots may have a subcarrier spacing of 120 kHz.

In the case of the 2.5 ms period, the later halves of the eight slots having indexes #8, #9, #18, #19, #28, #29, #38 and #39 may be PRACH occasions available for PRACH transmission, and the eight slots may have a subcarrier spacing of 120 kHz.

In the case of the 5 ms period, some slots having indexes #16, #17, #18, #19, #36, #37, #38, #39 in the last part of the period may be used as PRACH occasions.

In the case of the 10 ms period, some slots having indexes #32 to #39 in the last part of the period may be used as PRACH occasions.

In FR2, the values for the PRACH configuration may be given as follows:

x=16, y=1, subframe={{9},{19},{29},{39}};
x=8, y=1, subframe={{9},{19},{28},{39}};
x=4, y=1, subframe={{9},{19},{28},{39}};
x=2, y=1, subframe={{9}},{{19}},{29},{39};
x=1, y=1, subframe={{9},{19},{29},{39},{9,29},{19,39},{9,28,29},{19,38, 39},{8,18,28,38},{9,19,29,39},{35,36,37,38,39},{18,19,36,37,38,39}}.

6. OFDM Symbol Gap after the Last Symbol and/or DL Part of SSB

As discussed above, in FR1 and FR2, only PRACH occasions that are allocated to the UL part and an X part in the PRACH slot and precede or do not collide with the SSB are valid. In other words, valid PRACH occasions are positioned following at least N symbols after the last symbol and/or DL part of the SSB. That is, valid PRACH occasions are positioned following at least N gaps after the last symbol and/or DL part of the SSB.

Here, the number of OFDM symbols required as a gap between DL and UL will be discussed. The gap is determined based on a subcarrier spacing of Msg. 1, i.e., the PRACH preamble. When the subcarrier spacing of Msg. 1 is 15/30/60 kHz, N=2. When the subcarrier spacing of Msg. 1 is 120 kHz, an even number of OFDM symbols may be adopted as the DL/UL switching gap considering multiplexing between OFDM symbols having different numerologies. Accordingly, when the subcarrier spacing of Msg. 1 is 120 kHz, N may be N=2.

When two OFDM symbols are required as the switching gap, the index of the starting OFDM symbol in the PRACH slot needs to be configured according to the gap. For example, referring to FIG. 20(a), when the subcarrier spacing is 15 kHz, the last symbol index of the first SSB is 5. Accordingly, when two OFDM symbols are required as the DL/UL gap, the UE may transmit a PRACH preamble from the OFDM symbol with index 8. Referring to FIG. 20(b), it can be seen that, in the case of FR2, that is, when the subcarrier spacing is 120 kHz, the configuration is similar to the case where the subcarrier spacing is 15 kHz.

Accordingly, the starting OFDM symbol index of the PRACH occasion should be defined as an even index. In the PRACH configuration table for FR1 and TDD, the index of the starting OFDM symbol for formats A1, A2 and A3 may be defined as '8'. In the PRACH configuration table for FR2 and TDD, the index of the starting OFDM symbol for formats A1, A2, A3 and C2 may also be defined as '8'. Further, in the PRACH configuration table for FR1 and TDD, the index of the starting OFDM symbol for format A2/B2 may be defined as '2'.

7. Super Frame Number (SFN) Information and Frame Boundary for Target Cell

In NR, since the shortest period of the PRACH configuration is 10 ms, the UE should acquire frame boundary information in performing handover. In the frequency range below 3 GHz, an NR UE may obtain frame boundary information from a PBCH DMRS sequence. On the other hand, in a frequency band of 3 GHz or more, it is necessary to define a method for indicating frame boundary information for a target cell without PBCH decoding. Further, in NR, even if a PRACH entry having a 10 ms period is configured, the SFN information of the target cell may be required if the pattern period of association between the SSB and the PRACH occasion is longer than 10 ms.

In TDD, it may be assumed that the gNB is tightly synchronized within 2.5 ms and the same SFN is applied to the target cell. However, in FDD, it is difficult to assume tight synchronization. Accordingly, the gNB may provide SFN information such as an SFN offset between the serving cell and the target cell to the UE through a handover command.

8. Total Number of PRACH Occasions in PRACH Configuration Period

The total number of PRACH occasions may be calculated by multiplying the number of PRACH slots in a subframe, the number of PRACH occasions in a PRACH slot, the number of subframes per PRACH configuration index, the number of FDMed PRACH occasions in a time instance indicated by a 2-bit value, and the PRACH configuration period, which are included in the PRACH configuration.

In addition, the UE may derive the total number of PRACH occasions in the two-dimensional time/frequency domain based on the information above.

9. Rule for Mapping Valid PRACH Resource or Valid PRACH Occasion to SS/PBCH Block If the total number of PRACH occasions that may be allocated within the PRACH configuration period is determined, a method for mapping each SS/PBCH block to a PRACH occasion should be determined. If the number of PRACH occasions per SS/PBCH block is one, that is, one-to-one mapping is performed between the SS/PBCH blocks and the PRACH occasions, a method for mapping each SS/PBCH block to a PRACH occasion may be easily determined. This is because the SS/PBCH blocks only need to be sequentially mapped to the PRACH occasions. Similarly, if there is an FDMed PRACH occasion, the SS/PBCH blocks may be mapped to the PRACH occasions in the time domain after being mapped to the FAMed PRACH occasion. In this case, the time period of the PRACH occasions should be configured according to the PRACH configuration period. That is, the first actually transmitted SS/PBCH block included in an SSB burst set in each time period is mapped to the first PRACH occasion.

To create a more general mapping rule, the following parameters may be assumed:

X: the total number of RACH occasions;
$N_{SSB\_per\_RO}$: the number of SS blocks per RACH occasion
$N_{seq\_per\_SSB\_per\_RO}$: the number of CBRA preambles per SS block for an RACH transmission occasion;
M: the number of RACH occasions per SS block, where M is acquired by $N_{seq\_per\_SSB}/N_{seq\_per\_SSB\_per\_RO}$; and
Fd: the number of RACH occasions that may be simultaneously mapped to one SS block.

1) When M≥1:

If an SS block has a one-to-many mapping relationship with multiple RACH occasions mapped thereto, M is an integer satisfying M>1, and Fd=1, M TDMed RACH occasions may be sequentially mapped to the one SS block.

In other words, if 1/M, which is the number of SS blocks per RACH occasion, is less than 1, the SS block may be mapped to M RACH occasions. In this case, the RACH occasions mapped to the one SS block may be consecutive RACH occasions.

If Fd>1, the M RACH occasions are mapped to an SS block in frequency-time order. If M is a multiple of Fd, a single SS block may be mapped to FDMed RACH occasions for a certain time. If multiple SS blocks are mapped to one RACH occasion within the same time, it should be ensured that the beam directions are directions in which the network can receive beams corresponding to the multiple SS blocks at the same time.

The description above is summarized in Table 16 below.

TABLE 16

|  | M = 1 | M > 1 |
|---|---|---|
| Fd = 1 | Each SSB is mapped to a RO in a sequential manner in time domain | One SSB is associated with TDMed $N_{RO\_per\_SSB}$ RACH occasions. |

TABLE 16-continued

|  | M = 1 | M > 1 |
| --- | --- | --- |
| Fd > 1 | Each SSB is mapped to a RO in frequency-first and time-next manner according to the sequential order of SSB index. | One SSB is associated with $N_{RO\_per\_SSB}$ RACH occasions. The RACH occassions are mapped to a SSB in the frequency-first and time-next manner according to the sequential order of SSB index. |

2) When M<1:

Hereinafter, a case where multiple SS blocks are mapped to one RACH occasion, that is, many-to-one mapping is performed, will be described. When 0<M<1, 1/M=N, where N is defined as the number of SS blocks mapped to one RACH occasion. It is assumed that multiple SS blocks are CDMed to one RACH occasion, and the beam directions corresponding to the SS blocks are directions in which the network may simultaneously receive beams.

If a maximum number of RACH preamble indexes, such as 64 RACH preamble indexes, are allocated to the RACH occasions, comb-type mapping of RACH preambles to the respective SS blocks may be performed to increase RACH reception performance on the assumption that the RACH preambles are received in a spatial division multiple access (SDMA) manner. In other words, when two SS blocks are mapped to one RACH occasion, the other RACH preamble indexes are mapped to the two SS blocks. In this case, the actual cyclic shift allocated per SS block is defined as N×Ncs such that the reception performance of the RACH preamble may be improved.

When multiple SS blocks are associated with one RACH occasion, the preamble indexes of CBRA may be nonconsecutively mapped to the respective SS blocks to improve RACH performance. Mapping multiple SS blocks to multiple RACH occasions may also be considered, but it may be better to exclude this mapping method from the mapping types since this mapping method leads to implementation complexity.

10. CORESET and Search Space for PRACH Procedure

The CORESET and the search space for the PRACH procedure are not clear, but the CORESET for the PRACH procedure, that is, the CORESET for msg. 2/3/4 reception, should be identical the CORESET of the RMSI. The search space of msg. 2/3/4 should be all slots in a configuration duration. That is, the search space should include both the random access response (RAR) window of msg. 2 and a duration configured for msg. 3/4.

11. PRACH Mask Index

The PRACH mask is 4 bits and is used over both RRC and the PDCCH. The PRACH mask indexes are shown in Table 17 below.

TABLE 17

| PRACH mask Index | Allowed RACH occasion |
| --- | --- |
| 0 | All |
| 1 | RACH occasion index 1 |
| 2 | RACH occasion index 2 |
| 3 | RACH occasion index 3 |
| 4 | RACH occasion index 4 |
| 5 | RACH occasion index 5 |
| 6 | RACH occasion index 6 |
| 7 | RACH occasion index 7 |
| 8 | RACH occasion index 8 |
| 9 | Every even RACH occasion |
| 10 | Every odd RACH occasion |
| 11 | Reserved |
| 12 | Reserved |
| 13 | Reserved |
| 14 | Reserved |
| 15 | Reserved |

In the PRACH occasion group, the 3 bits for indicating the relative PRACH occasion indexes corresponding to the indicated SSB indexes may be assumed to be mapped to PRACH occasions having specific consecutive SSB indexes. That is, it may be assumed that the SSB per PRACH occasion is 1/N. The 3 bits may be used to indicate one of eight logically consecutive PRACH occasions. Based on the description above, three states shown in Table 17 (i.e., all, every even RACH occasion, and every odd RACH occasion) may be defined.

Here, the definition of the relative PRACH occasion indexes is unclear, and therefore it is necessary to clarify how to index PRACH occasions. FIG. 17 shows an example of indexing of PRACH occasions corresponding to indicated SSB indexes.

Figure 21:
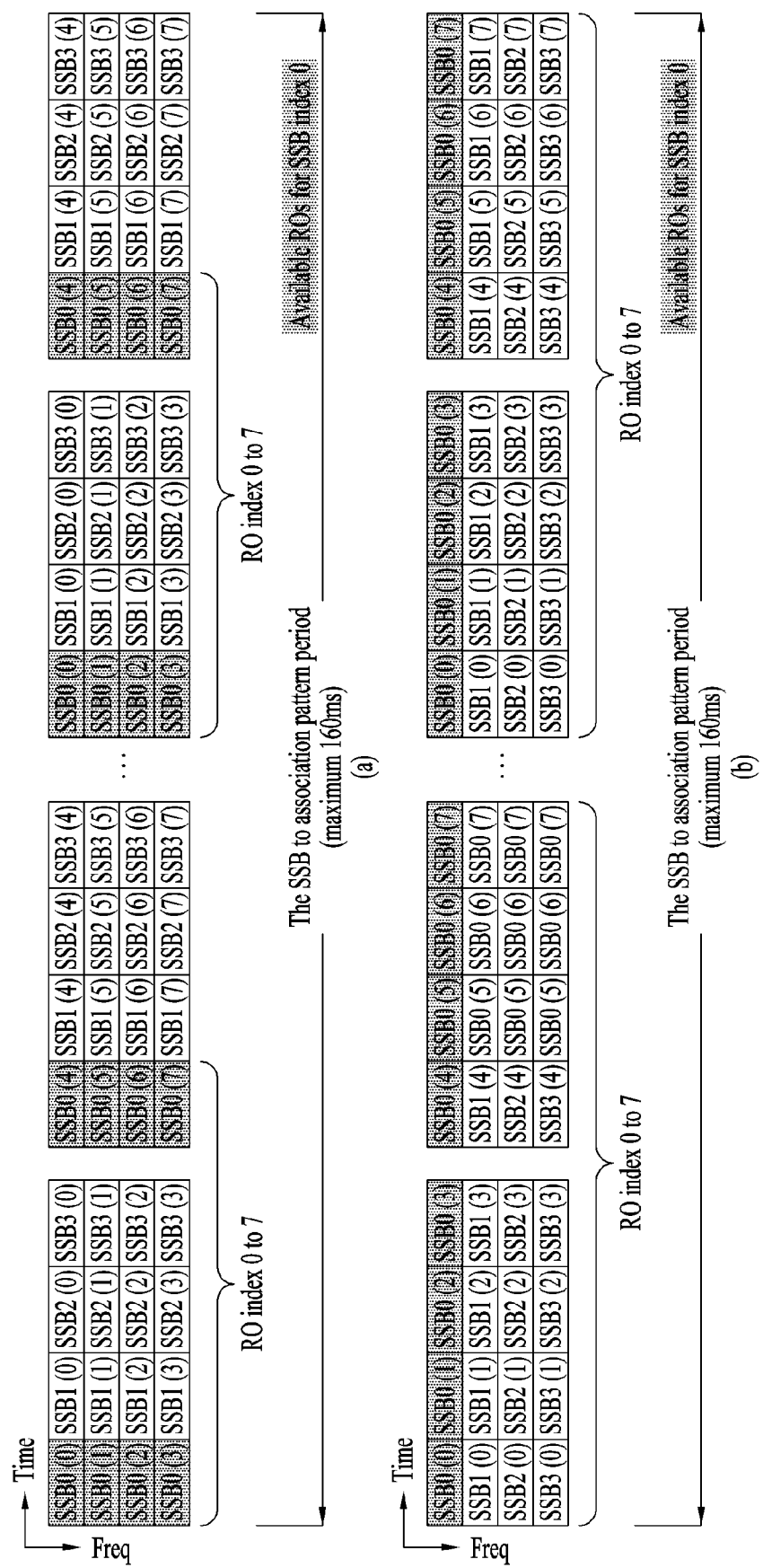

Referring to FIG. 21, PRACH occasion indexing for the PRACH mask is defined as follows:
 the number of PRACH occasions available for the SSB indexes indicated within a pattern period (up to 160 ms) of association between SSBs and PRACH occasions is calculated;
 PRACH occasion indexes #0 to #7 are periodically mapped from the first PRACH occasion to the last PRACH occasion;
 A PRACH occasion group consists of eight logically consecutive PRACH occasions.
 The indicated PRACH occasion indexes apply to all PRACH occasion groups.

12. CORESET/Search Space for PRACH Procedure (1) CORESET (Control Resource Set) for PRACH Procedure After the UE transmits a PRACH preamble on a PRACH occasion, the UE monitors the RAR within the configured RAR window. Since the RAR is transmitted on the PDSCH, the UE may monitor a corresponding PDCCH uses an RA-RNTI, and acquires time-frequency information about transmission of the PDSCH for the RAR through a downlink control indicator (DCI) for scheduling the RAR. Accordingly, the CORESET, which is the potential symbol and slot positions of the DCI for scheduling the RAR, may be indicated by the network through the PRACH configuration information. Specifically, the information about the CORESET for the PRACH procedure may be transmitted through the PRACH configuration included in the RMSI.

If the CORESET configuration for the PRACH procedure is not configured, the CORESET for RMSI reception is used for the PRACH procedure. That is, all messages related to PDCCH transmission, such as msg. 2/msg. 3 retransmission/msg. 4 scheduling, share the same CORESET during the PRACH procedure.

(2) Monitoring Window for PRACH Procedure

The UE monitors the RAR within a configured window after transmitting a PRACH preamble. In addition, due to the multi-beam operation, not only the DCI for the RAR but also the DCI for msg. 3 retransmission/msg. 4 scheduling is monitored within the configured window.

Specifically, since the window sizes for the respective messages do need not be different from each other, the windows configured for RAR reception, the DCI for msg. 3 retransmission, and the DCI for msg. 4 scheduling reception may have an identical size. The monitoring window for RAR reception starts from the first 'valid' downlink slot given considering the minimum timing gap after the UE transmits a PRACH preamble. Similarly, the monitoring window for msg. 3 retransmission/msg. 4 scheduling starts from the first valid downlink slot after the UE transmits msg. 3.

(3) Monitoring Occasions for PRACH Procedure

The UE may monitor all slots in a monitoring window to receive PRACH messages. Accordingly, it is necessary to clarify symbols to be monitored in each slot that the UE should monitor, namely, monitoring occasions. Unlike broadcast system information, which is transmitted in association with SSB indexes, a message for the PRACH procedure does not need to be associated with an SSB index.

Candidate monitoring occasions for RAR reception allocated in one slot may be known to the UE, and DCIs for PRACH messages may be transmitted on the monitoring occasions indicated in the respective slots in the monitoring window.

If the number of times of monitoring for RMSI reception is indicated as 1 in one slot through the PBCH, all UEs in the system monitor the PDCCH monitoring occasions starting on the first symbol of each slot during the monitoring window.

If the monitoring occasion indicated in one slot is 2, the UE needs to determine a monitoring occasion to monitor in the slot, i.e., whether to start monitoring on the first symbol of the slot or in the middle of the slot, such symbol #2, #3 or #7. Since the monitoring occasion is associated with an SSB index and the SSB index is already associated RA-RNTI generation, it may be simpler to associate the RA-RNTI value with the monitoring occasion.

For example, if the RA-RNTI value is an even number, the UE may attempt to detect the PDCCH within the monitoring occasion starting on the first symbol of every slot within the monitoring window. If the RA-RNTI value is an odd number, the UE attempts to detect the PDCCH on the monitoring occasion positioned in the middle of every slot within the monitoring window.

Figure 22:
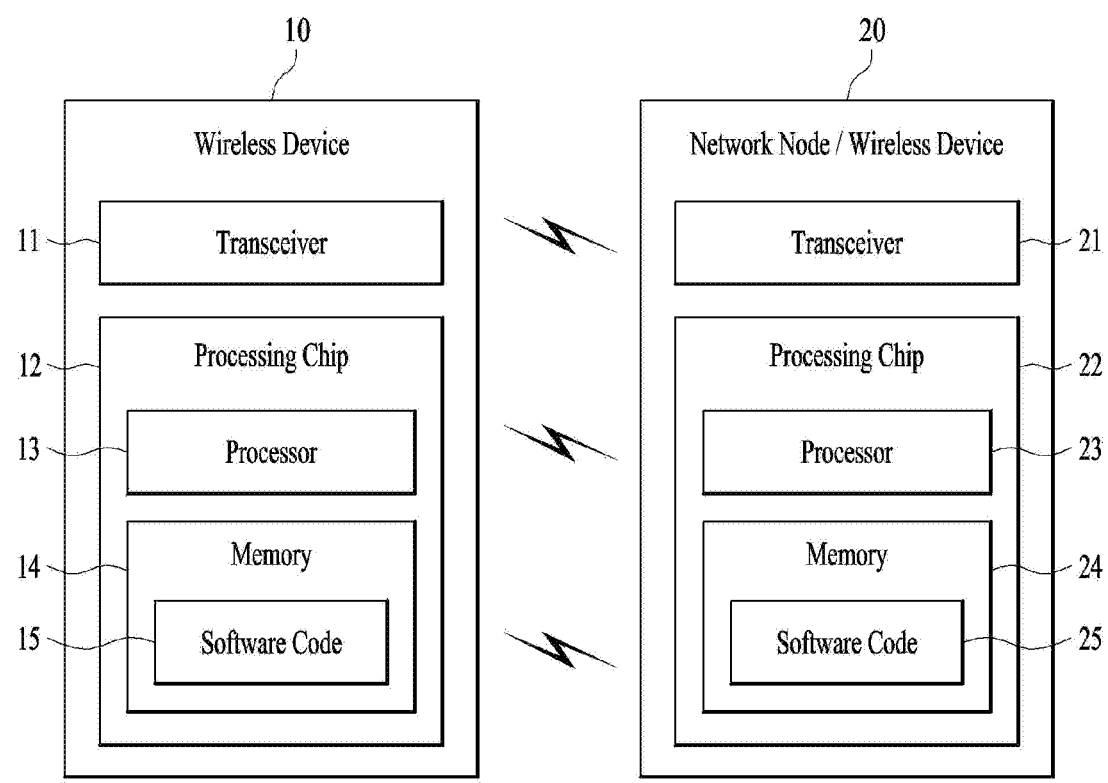
FIG. 22 is a block diagram illustrating components of a wireless device that implements the present invention.

FIG. 22 is a block diagram illustrating an example of communication between a wireless device 10 and a network node 20. Here, the network node 20 may be replaced with the wireless device of FIG. 22 or a UE.

In this specification, the wireless device 10 or the network node 20 includes a transceiver 11, 21 for communicating with one or more other wireless devices, network nodes, and/or other elements of the network. The transceivers 11 and 21 may include one or more transmitters, one or more receivers, and/or one or more communication interfaces.

In addition, the transceivers 11 and 21 may include one or more antennas. The antennas function to transmit signals processed by the transceivers 11 and 21 to the outside under control of the processing chips 12 and 22 or to receive wireless signals from the outside and transmit the signals to the processing chips 12 and 22, according to an embodiment of the present invention. The antennas are also referred to as antenna ports. Each antenna may correspond to one physical antenna or be configured by a combination of more than one physical antenna element. The signal transmitted from each antenna may not be further divided by the wireless device 10 or the network node 20. A reference signal (RS) transmitted for the corresponding antenna defines the antenna from the perspective of the wireless device 10 or the network node 20 and enables the wireless device 10 or the network node 20 to perform channel estimation for the antenna regardless of whether the channel is a single wireless channel from one physical antenna or a composite channel from a plurality of physical antenna elements including the antenna. That is, an antenna is defined such that a channel for delivering a symbol on the antenna may be derived from the channel through which another symbol on the same antenna is transmitted. A transceiver supporting a multi-input multi-output (MIMO) function to transmit and receive data using a plurality of antennas may be connected to two or more antennas.

In the present invention, the transceivers 11 and 21 may support reception beamforming and transmission beamforming. For example, in the present invention, the transceivers 11 and 21 may be configured to perform the functions illustrated in FIGS. 9 to 11.

In addition, the wireless device 10 or the network node 20 includes a processing chip 12, 22. The processing chips 12 and 22 may include at least one processor, such as a processor 13, 23, and at least one memory device, such as a memory 14, 24.

The processing chips 12 and 22 may control at least one of the methods and/or processes described herein. In other words, the processing chips 12 and 22 may be configured to implement at least one of the embodiments described herein.

The processors 13 and 23 include at least one processor for performing the function of the wireless device 10 or the network node 20 described herein.

For example, one or more processors may control the one or more transceivers 11 and 21 of FIG. 19 to transmit and receive information.

The processors 13 and 23 included in the processing chips 12 and 22 perform predetermined coding and modulation on signals and/or data to be transmitted to the outside of the wireless device 10 or the network node 20, and then transmit the signals and/or data to the transceivers 11 and 21. For example, the processors 13 and 23 convert a data sequence to be transmitted into K layers through demultiplexing, channel coding, scrambling, and modulation processes. The coded data sequence is also referred to as a code word and is equivalent to a transport block, which is a data block provided by the MAC layer. One transport block (TB) is coded into one code word, and each code word is transmitted to a reception device in the form of one or more layers. To perform frequency up-conversion, the transceivers 11 and 21 may include an oscillator. The transceivers 11 and 21 may include Nt transmit antennas (where Nt is a positive integer greater than or equal to 1).

In addition, the processing chips 12 and 22 include a memory 14, 24 configured to store data, programmable software code, and/or other information for implementing the embodiments described herein.

In other words, in the embodiments according to the present invention, when the memories 14 and 24 are executed by at least one processor, such as the processors 13 and 23, the memories allow the processors 13 and 23 to execute some or all of the processes controlled by the processors 13 and 23 of FIG. 19, or store software codes 15 and 25 including instructions for implementing the embodiments described herein based on FIGS. 1 to 21.

Specifically, the processing chip 12 of the wireless device 10 according to an embodiment of the present invention may control the transceiver 11 to receive information about PRACH resource allocation from the BS, and control the transceiver 11 based on the information to transmit the PRACH to the BS on one of a plurality of PRACH occasions allocated in the PRACH slot.

Here, the number of PRACH occasions allocated in the PRACH slot may be based on a preamble format for the PRACH and a starting orthogonal frequency division multiplexing (OFDM) symbol.

In addition, the processing chip 12 may acquire the preamble format and the starting OFDM symbol through the information about the PRACH resource allocation. Herein, the plurality of PRACH occasions may be consecutively allocated in the PRACH slot, staring with the starting OFDM symbol. In addition, the maximum number of PRACH occasions may be 6. When the preamble format has a duration corresponding to two OFDM symbols, the number of PRACH occasions is 6.

The plurality of PRACH occasions may be allocated only to the second half of the PRACH slot. If the preamble format has a duration corresponding to four OFDM symbols, the index of the starting OFDM symbol may be 9.

In addition, the processing chip 22 of the network node 20 according to the embodiment of the present invention may control the transceiver 21 to transmit information about the PRACH resource allocation to the UE, and control the transceiver 21 based on the information to receive the PRACH on one of a plurality of PRACH occasions allocated in the PRACH slot. Here, the number of PRACH occasions allocated in the PRACH slot may be based on a preamble format and a starting OFDM symbol for the PRACH.

In this case, the plurality of PRACH occasions may be consecutively allocated in the PRACH slot, staring with the starting OFDM symbol. In addition, the maximum number of PRACH occasions may be 6. If the preamble format has a duration corresponding to two OFDM symbols, the number of PRACH occasions is 6.

The plurality of PRACH occasions may be allocated only to the second half of the PRACH slot. If the preamble format has a duration corresponding to four OFDM symbols, the index of the starting OFDM symbol may be 9.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although a method for transmitting and receiving a physical random access channel and an apparatus therefor have been described based on the examples applied to the fifth generation NewRAT system, the method and the apparatus may also be applied to various wireless communication systems other than the fifth generation NewRAT system.

The invention claimed is:

1. A method for transmitting a physical random access channel (PRACH) by a user equipment (UE) in a wireless communication system, the method comprising:
   receiving information related to PRACH resource allocation; and
   transmitting, based on the information, the PRACH on any one of one or more PRACH occasions allocated in a PRACH slot,
   wherein a number of the one or more PRACH occasions is based on a preamble format for the PRACH and a starting Orthogonal Frequency Division Multiplexing (OFDM) symbol for the PRACH, and
   wherein the one or more PRACH occasions are allocated only to a second half of the PRACH slot.

2. The method according to claim 1, wherein the preamble format and the starting OFDM symbol are obtained via the information.

3. The method according to claim 1, wherein the one or more PRACH occasions are consecutively allocated in the PRACH slot from the starting OFDM symbol.

4. The method according to claim 1, wherein, when the preamble format has a duration of four OFDM symbols, an index of the starting OFDM symbol is 9.

5. A apparatus for transmitting a physical random access channel (PRACH) in a wireless communication system, the apparatus comprising:
   at least one processor; and
   at least one computer memory operably connectable to the at least one processor and storing instructions that, when executed by the at least one processor, perform operations comprising:
   receiving information related to PRACH resource allocation; and
   transmitting, based on the information, the PRACH on any one of one or more PRACH occasions allocated in a PRACH slot,
   wherein a number of the one or more PRACH occasions is based on a preamble format for the PRACH and a starting Orthogonal Frequency Division Multiplexing (OFDM) symbol for the PRACH, and
   wherein the one or more PRACH occasions are allocated only to a second half of the PRACH slot.

6. The apparatus according to claim 5, wherein the preamble format and the starting OFDM symbol are obtained via the information.

7. The apparatus according to claim 5, wherein the one or more PRACH occasions are consecutively allocated in the PRACH slot from the starting OFDM symbol.

8. The apparatus according to claim 5, wherein, when the preamble format has a duration of four OFDM symbols, an index of the starting OFDM symbol is 9.

9. A method for receiving a physical random access channel (PRACH) by a base station (BS) in a wireless communication system, the method comprising:

transmitting information related to PRACH resource allocation; and receiving, based on the information, the PRACH on any one of one or more PRACH occasions allocated in a PRACH slot, wherein a number of the one or more PRACH occasions is based on a preamble format for the PRACH and a starting Orthogonal Frequency Division Multiplexing (OFDM) symbol for the PRACH, and wherein the one or more PRACH occasions are allocated only to a second half of the PRACH slot.

* * * * *